(12) United States Patent
Kim et al.

(10) Patent No.: US 9,955,220 B2
(45) Date of Patent: *Apr. 24, 2018

(54) DEVICE AND METHOD FOR RECEIVING MEDIA CONTENT

(71) Applicant: LG Electronics Inc., Seoul (KR)

(72) Inventors: Kyungho Kim, Seoul (KR); Joonhui Lee, Seoul (KR); Jinpil Kim, Seoul (KR); Kyoungsoo Moon, Seoul (KR); Aettie Ji, Seoul (KR); Hotaek Hong, Seoul (KR); Hyeonjae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/627,549

(22) Filed: Jun. 20, 2017

(65) Prior Publication Data

US 2017/0339459 A1 Nov. 23, 2017

Related U.S. Application Data

(63) Continuation of application No. 14/364,260, filed as application No. PCT/KR2012/010806 on Dec. 12, 2012, now Pat. No. 9,712,874.

(Continued)

(51) Int. Cl.
*H04N 7/173* (2011.01)
*H04N 21/462* (2011.01)
(Continued)

(52) U.S. Cl.
CPC ..... *H04N 21/4622* (2013.01); *H04N 21/2381* (2013.01); *H04N 21/2393* (2013.01);
(Continued)

(58) Field of Classification Search
CPC .......... H04N 21/4622; H04N 21/4722; H04N 7/17318
(Continued)

(56) References Cited

U.S. PATENT DOCUMENTS 8,639,832 B2 * 1/2014 Biderman .......... H04N 7/17318
709/217
8,650,192 B2 * 2/2014 Biderman .......... H04N 7/17318
707/736
(Continued)

FOREIGN PATENT DOCUMENTS

KR           100656526         12/2006
KR    10-2011-0039520 A     4/2011
(Continued)

OTHER PUBLICATIONS

3GPP TR 36.888 v12.0.0, (Jun. 2013).
(Continued)

*Primary Examiner* — Annan Shang
(74) *Attorney, Agent, or Firm* — Dentons US LLP

(57) ABSTRACT

Provided is a media content receiving method of a media content receiving device. The method includes: receiving information on a content location information file; receiving the content location information file by using the information on the content location information file; measuring a current bandwidth; requesting a first media content through a first network on the basis of the current bandwidth and the content location information file; receiving the first media content through the first network; and consuming the first media content.

6 Claims, 15 Drawing Sheets

Related U.S. Application Data

(60) Provisional application No. 61/569,290, filed on Dec. 12, 2011.

(51) Int. Cl.

| | | |
|---|---|---|
| *H04N 21/858* | (2011.01) | |
| *H04N 21/845* | (2011.01) | |
| *H04N 21/2381* | (2011.01) | |
| *H04N 21/239* | (2011.01) | |
| *H04N 21/438* | (2011.01) | |
| *H04N 21/442* | (2011.01) | |
| *H04N 21/472* | (2011.01) | |
| *H04N 21/643* | (2011.01) | |
| *H04N 21/84* | (2011.01) | |

(52) U.S. Cl.
CPC ..... *H04N 21/438* (2013.01); *H04N 21/44209* (2013.01); *H04N 21/47202* (2013.01); *H04N 21/64315* (2013.01); *H04N 21/64322* (2013.01); *H04N 21/84* (2013.01); *H04N 21/8456* (2013.01); *H04N 21/8586* (2013.01)

(58) Field of Classification Search
USPC ........ 725/87, 88, 93, 101–116; 709/217–232
See application file for complete search history.

(56) References Cited

U.S. PATENT DOCUMENTS

| | | | | |
|---|---|---|---|---|
| 8,843,586 | B2* | 9/2014 | Pantos | H04N 21/4825 |
| | | | | 709/203 |
| 8,892,763 | B2* | 11/2014 | Moorthy | H04N 21/23406 |
| | | | | 709/231 |
| 9,185,439 | B2 | 11/2015 | Chen | |
| 9,236,976 | B2* | 1/2016 | Shokrollahi et al. | |
| 9,432,433 | B2 | 8/2016 | Luby | |
| 9,729,830 | B2* | 8/2017 | May, Jr. | H04N 7/17318 |
| 2009/0204487 | A1 | 8/2009 | Cansler et al. | |
| 2009/0325713 | A1 | 12/2009 | Cansler et al. | |
| 2011/0067081 | A1 | 3/2011 | Strom et al. | |
| 2011/0116772 | A1 | 5/2011 | Smith | |
| 2011/0145430 | A1 | 6/2011 | Ha | |
| 2012/0023251 | A1* | 1/2012 | Pyle | H04N 21/234327 |
| | | | | 709/231 |
| 2012/0233651 | A1 | 9/2012 | Lee et al. | |
| 2012/0254456 | A1* | 10/2012 | Visharam | H04N 21/2343 |
| | | | | 709/231 |
| 2012/0282951 | A1 | 11/2012 | Nguyen | |
| 2012/0317303 | A1* | 12/2012 | Wang | H04L 65/4076 |
| | | | | 709/231 |
| 2013/0034170 | A1* | 2/2013 | Chen | H04N 13/00 |
| | | | | 375/240.25 |
| 2013/0060888 | A1* | 3/2013 | Lee | H04N 21/2343 |
| | | | | 709/217 |
| 2013/0060911 | A1* | 3/2013 | Nagaraj | H04N 21/234327 |
| | | | | 709/219 |
| 2013/0091249 | A1* | 4/2013 | McHugh | H04N 21/23439 |
| | | | | 709/219 |
| 2013/0103949 | A1* | 4/2013 | Lund | G06F 21/34 |
| | | | | 713/184 |
| 2013/0125187 | A1* | 5/2013 | Kim | H04N 21/23608 |
| | | | | 725/109 |
| 2013/0238758 | A1* | 9/2013 | Lee | H04N 21/23439 |
| | | | | 709/218 |
| 2013/0293677 | A1* | 11/2013 | Lee | H04N 13/0059 |
| | | | | 348/43 |
| 2014/0025771 | A1 | 1/2014 | Tanaka et al. | |
| 2014/0115647 | A1* | 4/2014 | Kim | H04N 21/23439 |
| | | | | 725/110 |
| 2014/0237536 | A1* | 8/2014 | Jang | H04N 21/43 |
| | | | | 725/131 |

FOREIGN PATENT DOCUMENTS

| | | |
|---|---|---|
| KR | 1020110053178 | 5/2011 |
| KR | 1020110053179 | 5/2011 |
| KR | 1020110053180 | 5/2011 |
| KR | 1020110097596 | 8/2011 |

OTHER PUBLICATIONS

"Use cases for MPEG Media Transport(MMT)", ISO/IEC JTC1/SC29/WG11 N11542, Jul. 2010, Geneva, Switzerland.

"Use Cases for MPEG Media Transport (MMT);303 (GEN/16)", ITU-T Draft ; Study Period 2009-2012, International Telecommunication Union, Geneva ; CH, vol. Study Group 16, Aug. 12, 2010 (Aug. 12, 2010), pp. 1-12, XP017451959.

Shuichi Watanabe et al: "Considerations on Hybrid delivery support on MPEG Media Transport (MMT)", 96. MPEG Meeting; Mar. 21, 2011-Mar. 25, 2011; Geneva; (Motion Picture Expert Group or ISO/IEC JTC1/SC29/WG11) No. m20016, Mar. 16, 2011 (Mar. 16, 2011), XP030048583.

Iraj Sodagar: "The MPEG-DASH Standard for Multimedia Streaming Over the Internet", IEEE Multimedia, IEEE Service Center, New York, NY, US, vol. 18, No. 4, Apr. 1, 2011 (Apr. 1, 2011), pp. 62-67, XP011378371.

* cited by examiner

DEVICE AND METHOD FOR RECEIVING MEDIA CONTENT

This application is a continuation of U.S. application Ser. No. 14/364,260, filed on Jun. 10, 2014, which is a National Stage Entry of International Application No. PCT/KR2012/010806, filed on Dec. 12, 2012, and claims priority to and the benefit of U.S. Provisional Application No. 61/569,290, filed on Dec. 12, 2011, all of which are hereby incorporated by reference for all purposes as if fully set forth herein in their entireties.

TECHNICAL FIELD

The present disclosure relates to a device and method for receiving media content, and more particularly to a device and method for receiving adaptively receiving media content according to a current bandwidth.

BACKGROUND ART

Recently, the number of devices connected to internet is increased and various forms of receivers are manufactured. Especially, recent mobile devices have various codecs and resolutions and are basically equipped with network interfaces for connecting to an internet network. In general, mobile devices perform voice communication and data communication by accessing the networks of specific service providers and additionally transmit and receive content at high speed by accessing a network having a broad bandwidth such as Wi-Fi. A conventional broadcasting receiver such as a TV is only connected to a broadcasting network but a recent broadcasting receiver is equipped with a an Ethernet network interface and thus receives enhanced service by accessing an internet network through the Ethernet network interface.

Users want to use services and contents enjoyed in the PC environment through mobile devices while moving and also want to view contents played in a PC on a TV with large sized screen. Therefore, recent broadcasting receivers provide a supplementary network interface besides an existing network.

Such demands have highlighted the need for new transmission technology. The new transmission technology is a method for effective transmission through an internet network according to a situation of a receiver network. The development of technology for satisfying such demands is started by Moving Picture Experts Group (MPEG) and then the standard called MPEG-Dynamic Adaptive Streaming over HyperText Transfer Protocol (HTTP) (DASH) is established.

MPEG-DASH is created based on HTTP that transmits web services accounting for most network traffic on internet. Since a Content Delivery Network (CDN), that is, an existing network, uses HTTP delivery service greatly, an MPEG-DASH service may be easily applied. Additionally, since it is necessary for a broadcasting receiver to receive and play an image in the level that a user feels comfortable even in a network that does not guarantee Quality of Service (QoS), MPEG-DASH includes rules for a stream configuring an image or an encoding method.

A media receiver may measure a bandwidth at the reception side by measuring the size and transmission time of a currently received content by itself. If the bandwidth at the reception side is reduced suddenly, since content transmission is not smooth, a broadcasting receiver plays content until a media segment in a playback buffer is exhausted and then, if the playback buffer is empty during playback, the broadcasting receiver becomes not capable of playing the content. Therefore, a screen freezes.

The playback Lime of a media segment may vary according to its size or its encoding method even if the media segment has the same size. For example, if content is encoded in 150 kbps, a media receiver may play the content of 150 kbytes for 1 sec. In order to play the media content seamlessly, the media receiver may need to receive at least 150 kbytes for each 1 sec. At this point, 150 kbps is called a bitrate. Of course, the media receiver has a playback buffer and thus may deal with a temporary drop in bandwidth but may not deal with a continuous drop in bandwidth. That is, while the media receiver plays the content continuously, if media content is received in less than 150 kbytes for each 1 sec due to the bandwidth drop at the reception side, the playback buffer of the media receiver becomes empty and thus may not play the content.

Even if the media receiver has a limited playback buffer in a network environment that does not guarantee QoS, in order to play the media content seamlessly by receiving media streaming, a media server according to MPEG-DASH encodes the media content in consideration of a plurality of bandwidth situation as preparing the media content. That is, the media server encodes one media content in a plurality of bitrates. Additionally, the media server divides the encoded media content by the amount that is transmittable at one time FIG. 1 is a block diagram of a typical DASH delivery system.

As shown in FIG. 1, the DASH delivery system includes a DASH client device 10, a DASH media presentation preparation server 60, an MPD delivery function server 70, and a DASH segment delivery function server 80.

The DASH client device 10 understands a DASH protocol and may thus receive and play media content according to the DASH protocol. The DASH client device 10 monitors a network bandwidth at the current reception side and receives media content according to a current bandwidth.

The DASH media presentation preparation server 60 performs DASH media presentation preparation. For this, the DASH media presentation preparation server 60 encodes media content in a plurality of bitrates to generate an adaptation set and stores it on a disk. The adaptation set include a plurality of media representations. The plurality of media representations may correspond to the plurality of bitrates, respectively. Additionally, the plurality of bitrates may correspond to a plurality of resolutions, respectively. Each media representation includes a plurality of media segments. Moreover, the DASH media presentation preparation server 60 generates media presentation description (MPD) metadata and stores it on a disk. At this point, the MPD metadata includes information on an internet location through which a receiver accesses a plurality of media segments of each of a plurality of media representations.

The MPD delivery function server 70 has an MPD delivery function. The MPD delivery function server 70 transmits MPD metadata to the receiver.

The DASH segment delivery function server 80 has a DASH segment delivery function. The DASH segment delivery function server 80 transmits media segment to the receiver in response to a request of the receiver.

The DASH client device 10 and the DASH segment delivery function server 80 use HTTP. When the DASH client device 10 transmits a media segment to the DASH segment delivery function server 80 through an HTTP request, the DASH segment delivery function server 80 transmits a media segment to the DASH client device 100 through an HPPT response. The media segment may include an MPEG-2 TS media segment and an MP4 media segment.

The DASH client device 10 downloads MPD metadata, measures a current bandwidth, and checks a current bandwidth and an internet location of a media segment in a processable resolution and a processable encoding method, and then transmits an HTTP request for requesting a corresponding media segment to the checked internet location.

FIG. 2 is a block diagram of a typical DASH client.

As shown in FIG. 2, the typical DASH client device 10 includes a DASH access engine 11 and a media engine 12.

The DASH access engine 11 receives and processes MPD metadata and requests necessary media segments from the media segment delivery function server 80 to receive segment data. The DASH access engine 11 takes off metadata describing segments from buffered segment data and obtains timing information and information on other medias and then provides only MPEG media data to the media engine 12.

The media engine 12 corresponds to an MPEG-2 TS Processor (T-STD) and decodes MPEG media data and then plays it.

However, the current MPEG-DASH standard only includes how to deliver media segments and necessary information through HTTP and does not deal with how to transmit/receive an MPD metadata file and a linkage method with broadcasting services. However, the current MPEG DASH standard defines the MIME Type of MPD metadata as "application/dash+xml" so that a receiver checks the MIME Type of a URL and determines that this URL is the URL of MPD metadata.

DISCLOSURE OF THE INVENTION

Technical Problem

Embodiments provide a method of transmitting/receiving an MPD metadata file.

Embodiments also provide a method of linking an MPEG-DASH service with an existing broadcasting service.

Technical Solution

In one embodiment, provided is a media content receiving method of a media content receiving device. The method includes: receiving information on a content location information file; receiving the content location information file by using the information on the content location information file; measuring a current bandwidth; requesting a first media content through a first network on the basis of the current bandwidth and the content location information file; receiving the first media content through the first network; and consuming the first media content.

The consuming of the first media content may include: receiving a second media content through a second network; generating a combined service by combining the first media content and the second media content; and consuming the combined service.

In another embodiment, a media content receiving device includes: a first media content receiving unit; and a media content playing unit, wherein the first media content receiving unit receives information on a content location information file, receives the content location information file by using the information on the content location information file, measures a current bandwidth, requests a first media content through a first network on the basis of the current bandwidth and the content location information file, and receives the first media content through the first network; and the media content playing unit consumes the first media content.

The device further includes a second media content receiving unit receiving a second media content through a second network, wherein the media content playing unit consumes a combined service by combining the first media content and the second media content.

In further another embodiment, a media content transmitting device includes: a media content preparation unit preparing a content location information file and an adaptation set; a first media content transmitting unit transmitting information on the content location information file through a first network; a content location information transmitting unit transmitting the content location information file; and a second media content transmitting unit transmitting a media segment in the adaptation set through a second network according to a request based on the content location information file.

Advantageous Effects

According to an embodiment of the present invention, a media content delivery device may effectively transmit an MPD metadata file to a media content receiving device.

Especially, according to an embodiment of the present invention, by applying an MPEG-DASH service to an TPTV service, load on the stable network management of an IPTV service provider may be reduced.

Additionally, according to an embodiment of the present invention, various services may be provided by combining an existing broadcasting service and an MPEG DASH service.

MODE FOR CARRYING OUT THE INVENTION

Hereinafter, a mobile terminal relating to the present invention is described in more detail with reference to the drawings. The suffixes "module" and "unit" for components used in the description below are assigned or mixed in consideration of easiness in writing the specification and, do not have distinctive meanings or roles by themselves.

Figure 1:
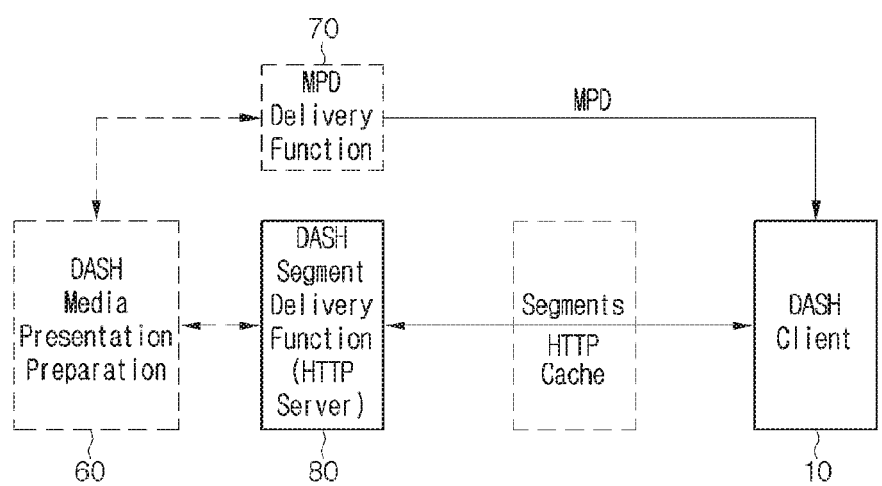
FIG. 1 is a block diagram of a typical DASH delivery system.
Figure 2:
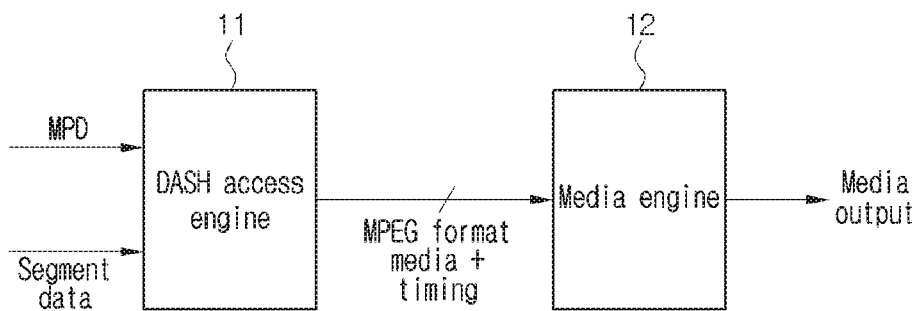
FIG. 2 is a block diagram of a typical DASH client.
Figure 3:
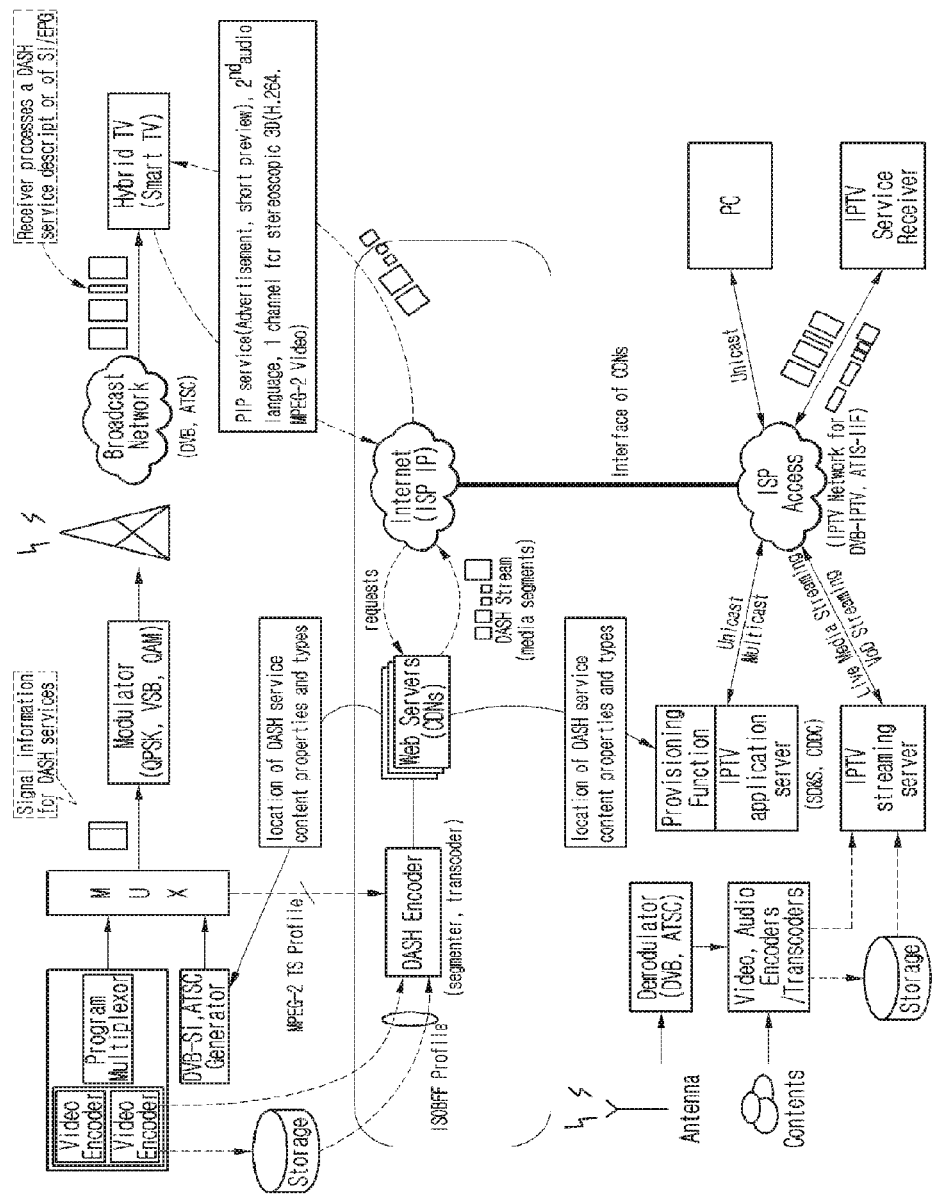
FIG. 3 is a view illustrating a DASH service signaling method in a terrestrial and IPTV broadcasting network.

FIG. 3 is a view illustrating a DASH service signaling method in a terrestrial and IPTV broadcasting network.

MPEG-DASH relates to a technique for adaptively and dynamically transmitting media content in an internet or IP network according to a transmission state thereof. If media content is transmitted seamlessly in such a way, broadcasting services may be stably transmitted via a broadcasting network having a fixed bandwidth and supplementary media content may be serviced to an existing broadcasting service via an IPTV network on the basis of DASH. Especially, since services such as Netflix operate in an external CDN network, QoS is not secured. However, according to a DASH based adaptive transmission method, media content service may be provided unnoticeably. Especially, FIG. 3 is a view when a media receiver uses an adaptive content receiving method in a broadcasting network and an IPTV network.

Figure 4:
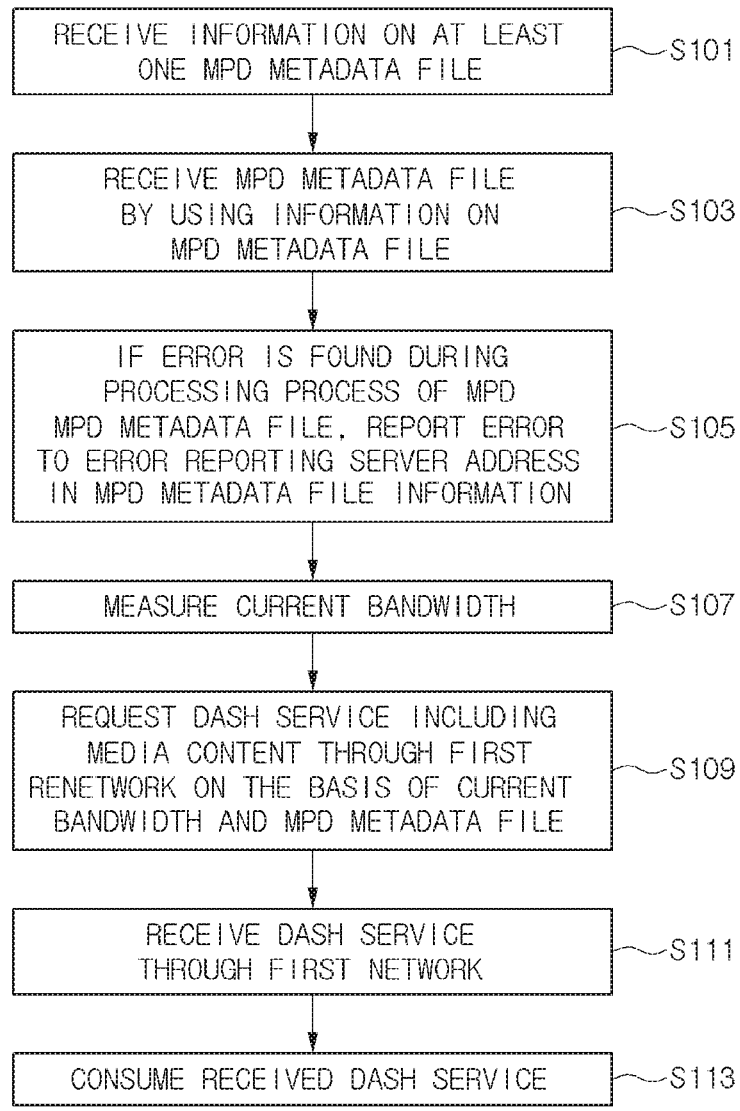
FIG. 4 is a flowchart illustrating a method of receiving DASH service according to an embodiment of the inventive concept.

FIG. 4 is a flowchart illustrating a method of receiving DASH service according to an embodiment of the prevent invention.

First, the media content receiving device 100 receives information on at least one MPD metadata file in operation S101. At this point, the information on at least one MPD metadata includes at least one of information on the location of each MPD metadata file, information on the required capacity of each MPD metadata file, and information on the address of a server for reporting an error during a processing process of each MPD metadata file. The information on the required capacity of each metadata file may include at least one of information on the DASH spec version of each MPD metadata file and information on a profile that each MPD metadata file supports.

The media content receiving device 100 receives an MPD metadata file by using information on an MPD metadata file in operation S103. Upon the receipt of information on a plurality of MPD metadata, the media content receiving device 100 selects an MPD metadata file corresponding to a required capacity that the media content receiving device 100 is capable of processing from the plurality of MPD metadata files and receives the selected MPD metadata file by requesting the selected MPD metadata file from an internet location corresponding to the selected MPD metadata file. That is, the media content receiving device 100 may search for a processable MPD metadata file on the basis of the DASH spec version and profile information in the MPD metadata file information and may receive an MPD metadata file by accessing the location of the processable MPD metadata file. When the DASH media presentation preparation server 60 generates an MPD metadata file supporting various DASH spec versions and various profiles, the size of the MPD metadata file becomes greater, so that it is difficult to transmit such an MPD metadata file and also it is difficult for the media content receiving device 100 to process such an MPD metadata file. Accordingly, when the DASH media presentation preparation server 60 creates a plurality of MPD metadata files for each of a plurality of DASH spec versions and each of a plurality of profiles and generates information on the MPD metadata file for this, and distributes an MPD metadata file in additional to information on the MPD metadata file, the transmission efficiency of an MPD metadata file may be increased and the processing load of the media content receiving device 100 may be reduced. An MPD metadata file will be described with reference to FIG. 5 and Table 1.

Figure 5:
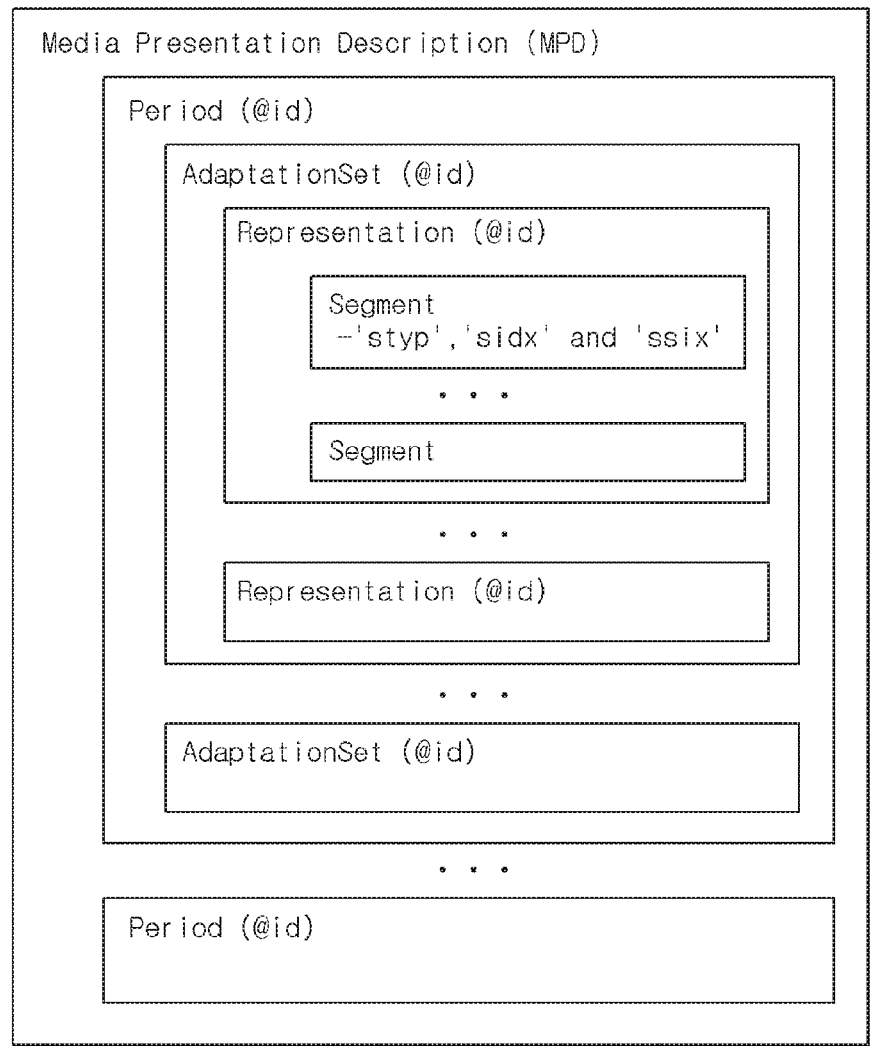
FIG. 5 is a view illustrating a structure of an MPD metadata file according to an embodiment of the present invention.

FIG. 5 is a view illustrating a structure of an MPD metadata file according to an embodiment of the present invention.

As shown in FIG. 5, an MPD metadata file includes an MPD element. The MPD element includes at least one Period element. Each Period element includes at least one AdaptationSet element. Each AdaptationSet element includes at least one Representation element. Each Representation element includes a segment element.

Table 1 illustrates an example of an MPD metadata file according to an embodiment of the present invention.

TABLE 1

```
<?xml version="1.0" encoding="UTF-8"?>
<MPD
    xmlns:xsi="http://www.w3.org/2001/XMLSchema-instance"
    xmlns="urn:mpeg:DASH:schema:MPD:2011"
    xsi:schemaLocation="urn:mpeg:DASH:schema:MPD:2011"
    type="static"
    mediaPresentationDuration="PT6158S"
    availabilityStartTime="2011-05-10T06:16:42"
    minBufferTime="PT1.4S"
    profiles="urn:mpeg:profile:dash:m2ts-simple"
    maxSegmentDuration="PT4S">
    <BaseURL>http://cdn1.example.com/</BaseURL>
    <BaseURL>http://cdn2.example.com/</BaseURL>
    <Period id="42" duration="PT6158S">
        <AdaptationSet
            mimeType="video/mp2t"          codecs="avc1.4D401F,mp4a"
            frameRate="24000/1001"          segmentAlignment="true"
            subsegmentAlignment="true"      bitstreamSwitching="true"
            startWithSAP="2"                subsegmentStartsWithSAP="2">
            <ContentComponent contentType="video" id="481"/>
```

TABLE 1-continued

```
        <ContentComponent contentType="audio" id="482" lang="en"/>
        <ContentComponent contentType="audio" id="483" lang="es"/>
        <BaseURL>SomeMovie_</BaseURL>
        <SegmentTemplate
            media="$RepresentationID$_$Number%05$.ts"
            index="$RepresentationID$.sidx"
            initialisation="$RepresentationID$-init.ts"
            bitstreamSwitching="$RepresentationID$-bssw.ts"
            duration="4"                startNumber="1"/>
        <Representation id="720kbps" bandwidth="792000" width="640"
        height="368"/>
        <Representation id="1130kbps" bandwidth="1243000" width="704"
        height="400"/>
        <Representation id="1400kbps" bandwidth="1540000" width="960"
        height="544"/>
        <Representation id="2100kbps" bandwidth="2310000" width="1120"
        height="640"/>
        <Representation id="2700kbps" bandwidth="2970000" width="1280"
        height="720"/>
        <Representation id="3400kbps" bandwidth="3740000" width="1280"
        height="720"/>
      </AdaptationSet>
   </Period>
</MPD>
```

The current MPEG-DASH transmission server may transmit two formats of media contents. These two formats include MPEG-2 TS used as a streaming format of a terrestrial and cable broadcasting system and an ISO Based File Format (MP4) created for storing content and transmitting it to internet. Since current DVB-IPTV and ATSC basically use MPEG-2 TS as a Container Format, Table 1 is an example for a media content in an MEPG-2 TS format.

As shown in Table. 1, an MPD metadata file of an XML structure includes an MPD element.

The MPD element includes a minBufferTime attribute, a profiles attribute, and a maxSegmentDuration attribute.

The minBufferTime attribute includes information on the minimum buffer Lime for playing media content. That is, after obtaining media content according to a time corresponding to the minBufferTime attribute, a receiver may start playing the media content. In Table 1, the minimum buffer time is 1.4 sec.

The profiles attribute includes information on a profile that the MPD metadata file supports. In Table 1, a profile that the MPD metadata file supports is m2ts-simple.

The maxSegmentDuration attribute includes information on the maximum segment duration. In Table 1, the maximum segment duration is 4 sec.

The MPD element includes at least one BaseURL element and at least one Period element.

The receiver may check the internet location of a desired media segment by combining information on the BaseURL element and information on the SegmentTemplate element and may access a corresponding media segment through the internet location. When the MPD element includes a plurality of BaseURL elements, the receiver may selectively or entirely use a plurality of servers respectively corresponding to the plurality of BaseURL elements on the basis of a response speed of a server.

The MPD element may include at least one Period element and each Period element has a duration attribute. The duration attribute includes information on a playback time of media content. In Table 1, the playback time of media content is 6158 sec.

Each Period element includes at least one AdaptationSet element.

The AdaptationSet element includes at least one ContentComponenL element, a BaseURL element, a SegmentTemplate element, and at least one Representation element. In order to reduce the size of the MPD metadata, the SegmentTemplate element representing the internet location of a segment may be used.

Each Representation element includes an id attribute, a bandwidth attribute, a width attribute, and a height attribute.

If errors are found during a processing process of an MPD metadata file, the media content receiving device 100 reports the errors to an error report server address in MPD metadata file information in operation S105. The Annex of MPEG-DASH regulates Quality Metric (QM) and external service providers obtain QM information to have bargaining power with a CDN operator. Accordingly, when MPD metadata file information includes DASHQMReportLocation information corresponding to an error report server address, the media content receiving device 100 collects QM information and then report it to a server corresponding to DASHQMReportLocation.

The media content receiving device 100 measures the current bandwidth in operation S107. The media content receiving device 100 may measure the current bandwidth on the basis of the size of a previously received media segment and a time taken for receiving the media segment.

The media content receiving device 100 requests a DASH service including media content through a first network on the basis of the current bandwidth and an MPD metadata file in operation S109. At this point, if the QoS of an internet network is not secured, the first network may be a network where QoS is not secured. The first network may be an internet network. Additionally, if the QoS of an IPTV broadcasting network is not secured, the first network may be an IPTV broadcasting network. The media content receiving device 100 may recognize the internet location of a media segment of media content for the current bandwidth by using the MPD metadata file and may request a media segment from the recognized internet location.

In response to a DASH service, the media content receiving device 100 receives the DASH service through the first network in operation S111. The media content receiving device 100 may receive the DASH service including media content by receiving the media segment.

The media content receiving device 100 consumes the received DASH service in operation S113.

According to an embodiment of the present invention, the media content receiving device 100 may play the received DASH service as main content.

According to another embodiment of the present invention, the media content receiving device 100 may consume the DASH service by combining broadcasting service with the DASH service. A DASH service consuming method according to an embodiment of the present invention will be described with reference to FIG. 6.

Figure 6:
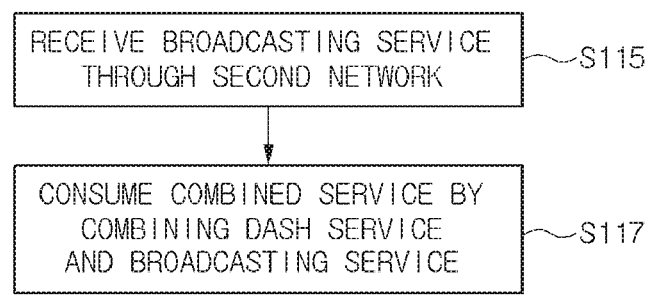
FIG. 6 is a flowchart illustrating a DASH service consuming method according to an embodiment of the present invention.

FIG. 6 is a flowchart illustrating a DASH service consuming method according to an embodiment of the present invention.

The media content receiving device 100 receives broadcasting service through a second network in operation S115. At this point, the second network may be a network where QoS is secured. For example, the second network may include a terrestrial broadcasting network, a cable broadcasting network, a satellite broadcasting network, an ATSC broadcasting network, and a DVB broadcasting network. Especially, when the QoS of an internet network is secured, the second network may be an internet network. Additionally, if the QoS of an IPTV broadcasting network is not secured, the first network may be an IPTV broadcasting network.

The media content receiving device 100 may consume a combined service by combining DASH service with broadcasting service in operation 3117.

According to an embodiment of the present invention, the combined service may be PIP service. The PIP service includes a main service and a sub service. The media content receiving device 100 may display the main service on a main area of a screen and also may display the sub service on a sub area of the screen. In general the size of the main area is greater than that of the sub area. For example, the main area corresponds to an entire screen and the sub area corresponds to a portion of the screen. The broadcasting service may become the main service of the PIP service and the DASH service may become the sub service of the PIP service. Additionally, the broadcasting service may become the sub service of the PIP service and the DASH service may become the main service of the PIP service. The main service may correspond to real-time broadcast content and the sub service may correspond to a media content relating to the main service. For example, the sub service may include main service-related ads, local ads, previews, following broadcast program notices, and sports commentary broadcast contents. Information on an MPD metadata file or an MPD metadata file may include information on the location and size of a sub area. The media content receiving device 100 may receive the information on the location and size of a sub area through an additional method instead of using information on an MPD metadata file or the MPD metadata file. The media content receiving device 100 may access a DASH service through a web application.

According to another embodiment of the present invention, the combined service may be an audio alternative service. In this embodiment, the broadcasting service may include main video content and main audio content and the DASH service may include sub audio content. The media content receiving device 100 may play the sub audio content instead of the main audio content while playing the main video content. The sub audio content may be based on language different from that of the main audio content. For example, the main audio content may be based on English based audio and the sub audio content may be Korean based audio. Moreover, the quality of the sub audio content may be higher than that of the main audio content. For example, the compression rate of the sub audio content may be lower than that of the main audio content. Additionally, the audio codec of the sub audio content may be different from that of the main audio content. The media content receiving device 100 may receive signaling information on the sub audio content and if it is notified that the signaling information uses the sub audio content, the media content receiving device 100 may receive a DASH service on the basis of DASH.

According to another embodiment of the present invention, the combined service may be a high quality audio service. In this embodiment, the broadcasting service may include main video content and main audio content and the DASH service may include sub audio content. The media content receiving device 100 may play a high-quality audio content by combining the main audio content and the sub audio content while playing the main video content. For example, the main audio content may include a 2 channel audio content for stereo playback or a 1 channel audio content for mono playback and the sub audio content may include the remaining audio content for multi-channel audio playback. In this case, the media content receiving device 100 may play 5 channel audio by using a main audio content including audio data for 2 channels and audio data for 3 channels. Moreover, the main audio content may include low-quality audio data having a high compression rate and the sub audio content may include differential audio data for generating high-quality audio data. In this case, the media content receiving device 100 may generate high-quality audio data by combining low-quality audio data and differential audio data and may play the generated high-quality audio data. The media content receiving device 100 may receive signaling information on the sub audio content and if it is notified that the signaling information uses the sub audio content, the media content receiving device 100 may receive a DASH service on the basis of DASH.

According to another embodiment of the present invention, the combined service may be an interactive electronic program guide (EPG) service. Tn this embodiment, the broadcasting service may include an interactive EPG including guide information on a real time broadcast program and guide information on a media content relating to the real-time broadcasting program. When receiving a broadcasting service including an interactive EPG, the media content receiving device 100 plays the interactive EPG. Then, when receiving a user input for playing a media content relating to a real-time broadcast program through the interactive EPG is received through a remote controller, the media content receiving device 100 receives and plays a DASH service including the media content relating to the real-time broadcast program by performing the processes of FIG. 4.

According to another embodiment of the present invention, the combined service may be a 3D image service. In this embodiment, the broadcasting service may include one of a plurality of images for playing a three-dimensional image and the DASH service may include another one of the plurality of images for playing a three-dimensional image. An image that the broadcasting service includes may be a reference image. The plurality of images may include left-eye images and right-eye images. Additionally, the plurality of images may include upper images and lower images. Due to a limited bandwidth of a content transmission channel, a broadcasting station is required to lower the resolution of an image and transmit a plurality of images in order for a 3D image service. However, at this point, in the case of a media receiver that is not capable of playing a 3D image, only a low resolution image is played. However, according to this embodiment of the present invention, even when a broadcasting station encodes a reference image into a normal resolution, for example, HD, and transmits it without lowering a resolution, the media content receiving device 100 may play a 3D image by combining a broadcasting service and a DASH service. Additionally, a media receiver that is not capable of playing a 3D image and a media receiver that is not connected to internet may play an image of a normal resolution.

Figure 7:
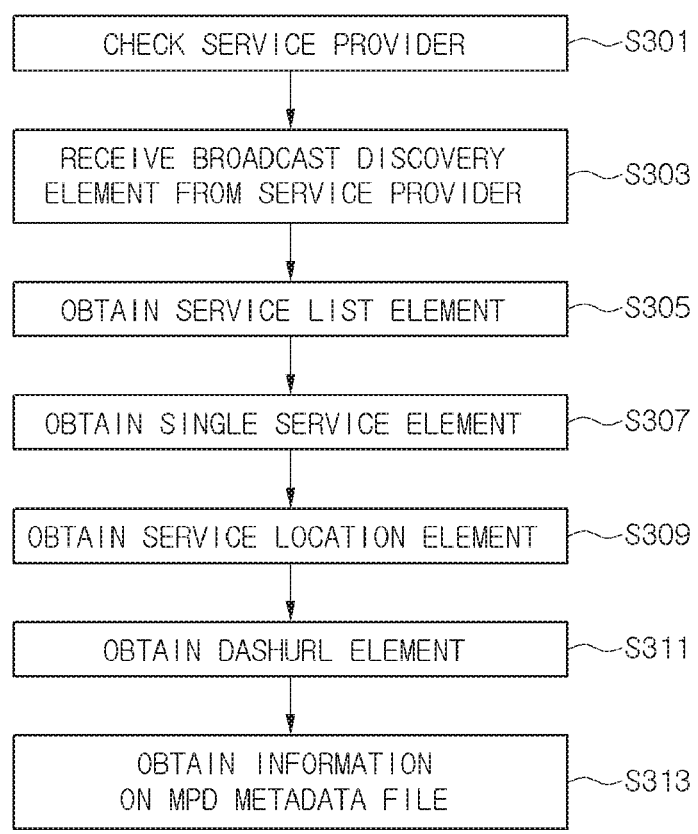
FIG. 7 is a flowchart illustrating a method of receiving information on MPD metadata according to an embodiment of the prevent invention.

FIG. 7 is a flowchart illustrating a method of receiving information on MPD metadata according to an embodiment of the prevent invention.

Especially, FIG. 7 illustrates a method of receiving information on MPD metadata in a DVB-IPTV environment.

If IPTV service providers are not capable of dealing service directly, they may rent an IPTV broadcasting network to third party content providers. Especially, this corresponds to the case in which instead of network, only content is used for business. The DVB-IPTV broadcasting network is a managed network but an IPTV service provider may configure SD&S information and may provide a plurality of services as a package to media receivers. For example, the IPTV service provider may insert information on several content providers into the SD&S information and may provide a content of a content provider to the media receiver according to a bandwidth. For this, IPTV service providers may provide services that they guarantee safely while ensuring the QoS and may provide various contents as enhanced service to media receivers while not ensuring the QoS. However, the media receivers may need to receive an MPD metadata file first in order to receive a supplementary DASH service. Accordingly, the IPTV service provider may insert information for signaling a DASH service into an SD&S field as follows.

An SD&S Schema includes a BroadcastDiscovery element of a BroadcastOfferriny Lype. The BroadcastDiscovery element includes a ServiceList element of an IPServiceList type for at least one service. The ServiceList element includes at least one SingleService element of an IPService type. The SingleService element includes a ServiceLocation element of a ServiceLocation type. In general, one service in an IPTV broadcasting network is transmitted through a multicast method and a unicast method. The ServiceLocation element includes an IPMulticastAddress element containing information for a multicast method and a Real Time Streaming Protocol uniform resource locator (RTSPURL) element containing information for a unicast method. Especially, the IPMulticastAddress element includes a multicast address and the RTSPURL element includes a URL for Real Time Streaming Protocol.

A DASH transmission method belongs to a unicast transmission method but a media receiver is required to receive an MPD file first in order to receive a DASH service, so that using an existing RTSPURL element may not be appropriate in order to provide information for a DASH transmission method. That is, if an existing RTSPURL element is used as it is, the comparability issue of an existing receiver arises.

According to an embodiment of the present invention, the ServiceLocation element adds a DASH uniform resource locator (DASHURL) element, that is, an additional element for containing information for a DASH transmission method. An TPTV service provider may selectively use the IPMulticastAddress element, the RTSPURL element, and the DASHURL element. The DASHURL element has a DASHType.

Hereinafter, a method of the media content receiving device 100 to receive information on MPD metadata in an IPTV environment will be described in more detail.

The media content receiving device 100 checks a service provider in operation S301.

The media content receiving device 100 receives a BroadcastDiscovery element of a BroadcastOfferring type from a service provider in order for service discovery in operation S303.

The media content receiving device 100 obtains a ServiceList element from the BroadcastDiscovery element in operation S305. The ServiceList element will be described with reference to FIG. 8.

Figure 8:
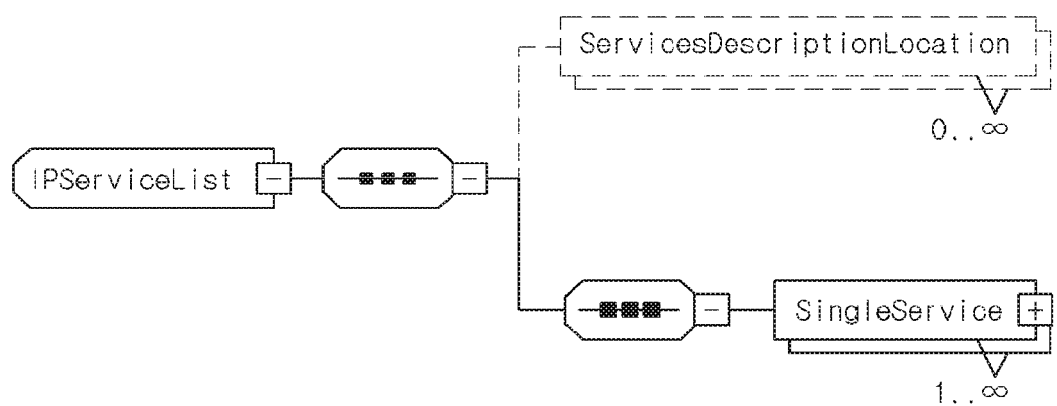
FIG. 8 is a view illustrating an XML structure of a ServiceList element of an internet service list type.

FIG. 8 is a view illustrating an XML structure of a ServiceList element of an internet service list type.

As shown in FIG. 8, the ServiceList element of the internet service list type includes at least one ServiceDescriptionLocation element and at least one SingleService element.

The media content receiving device 100 obtains a SingleService element of an IPService type from the ServiceList element in operation S307. The SingleService element of the IPService type will be described with reference to FIG. 9.

Figure 9:
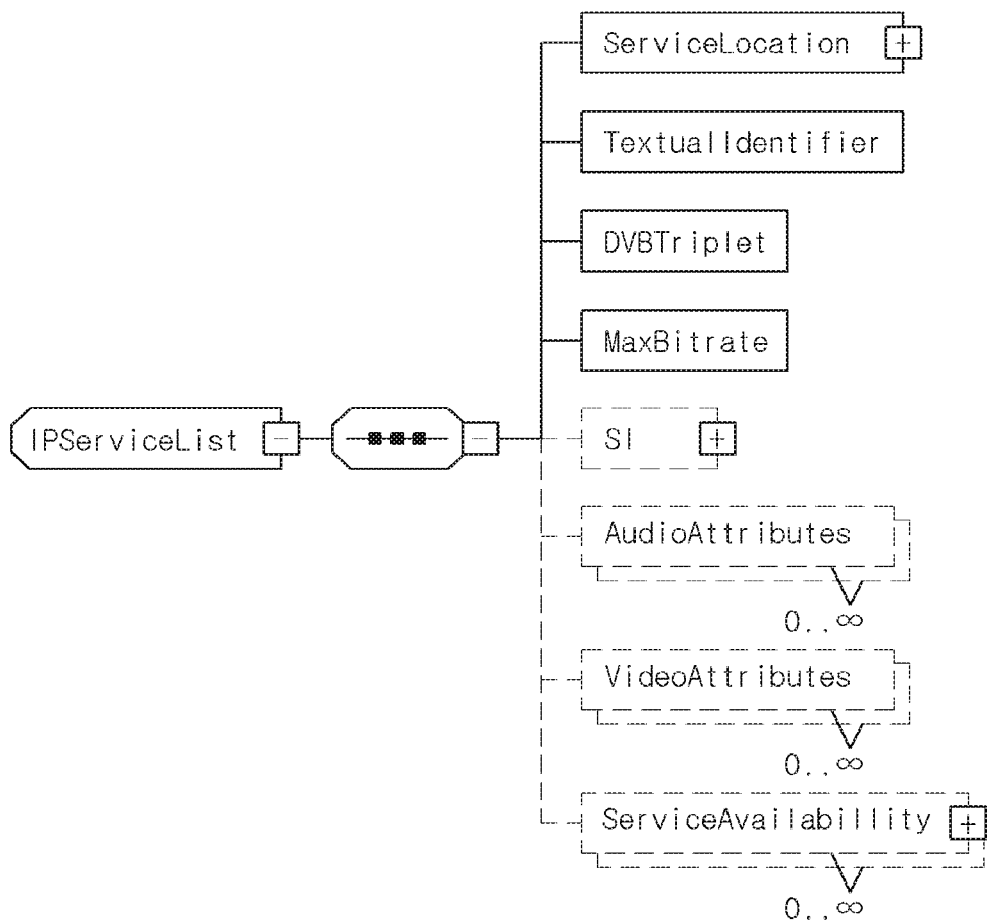
FIG. 9 is a view illustrating an XML structure of a SingleService element of an IPService type according to an embodiment of the present invention.

FIG. 9 is a view illustrating an XML structure of a SingleService element of an IPService type according to an embodiment of the present invention.

As shown in FIG. 9, the SingleService element of the IPService type according to an embodiment of the present invention includes a ServiceLocation element, a TextualIdentifier element, a DVBTriplet element, a MaxBitrate element, an SI element, an AudioAttributes element, a VideoAttributes element, and a ServiceAvailabilty element.

Table 2 illustrates descriptions for elements that a SingleService element includes.

TABLE 2

| Name | Definition |
|---|---|
| TextualIdentifier | The Textual identifier by which the service is known. If the domain name is missing, it is taken from the context. |
| DVBTriplet | The DVB Triplet by which the service is known. This will match the service details inside the transport stream. |
| ServiceLocation | The locations at which the service can be found. |
| MaxBit rate | The peak bitrate (in kbits/s) at which the transport stream carrying the service will operate. |
| SI | Service information about the service carried. |
| VideoAttributes | Each instance of this value specifies a way of coding the video that may be used at some point during the operation of the service. If this element is missing, then the default value of MPEG-2 coded video, operating at MP@ML at a frame rate of 25 Hz shall be used; specifically this shall be the legacy value from TS 101 154 [58]. The format of this type is defined in clause 6.3.5 of TS 102 822-3-1 [60]. |

TABLE 2-continued

| Name | Definition |
|---|---|
| AudioAttributes | The values carried in the href attribute of the Coding element shall be defined by the classification specified in the file VideoCodecCS.xml (and by reference MPEG7 VisualCodingFormatCS.xml) included in ts_102034v010301p0.zip, or, preferably, as defined by TS 102 323 [59]. Each instance of this value specifies a way of coding the audio that may be used at some point during the operation of the service. If this element is missing, then the default value of MPEG-1 or MPEG-2 layer 2 backwards compatible, mono or stereo shall be used; specifically this shall be the legacy value from TS 101 154 [58]. The format of this type is defined in clause 6.3.5 of TS 102 822-3-1 [60]. The values carried in the href attribute of the Coding element shall he defined by the classification specified in the file AudioCS.xml (and by reference MPEG7 AudioCS.xml) included in ts_102034v010301p0.zip, or, preferably. as defined by TS 102 323 [59]. |
| ServiceAvailabilty | Defines the geographical regions in which this service is available or not available. |

The media content receiving device 100 obtains a ServiceLocation element of a ServiceLocation type from the SingleService element in operation S309. The ServiceLocation element will be described with reference to FIG. 10.

Figure 10:
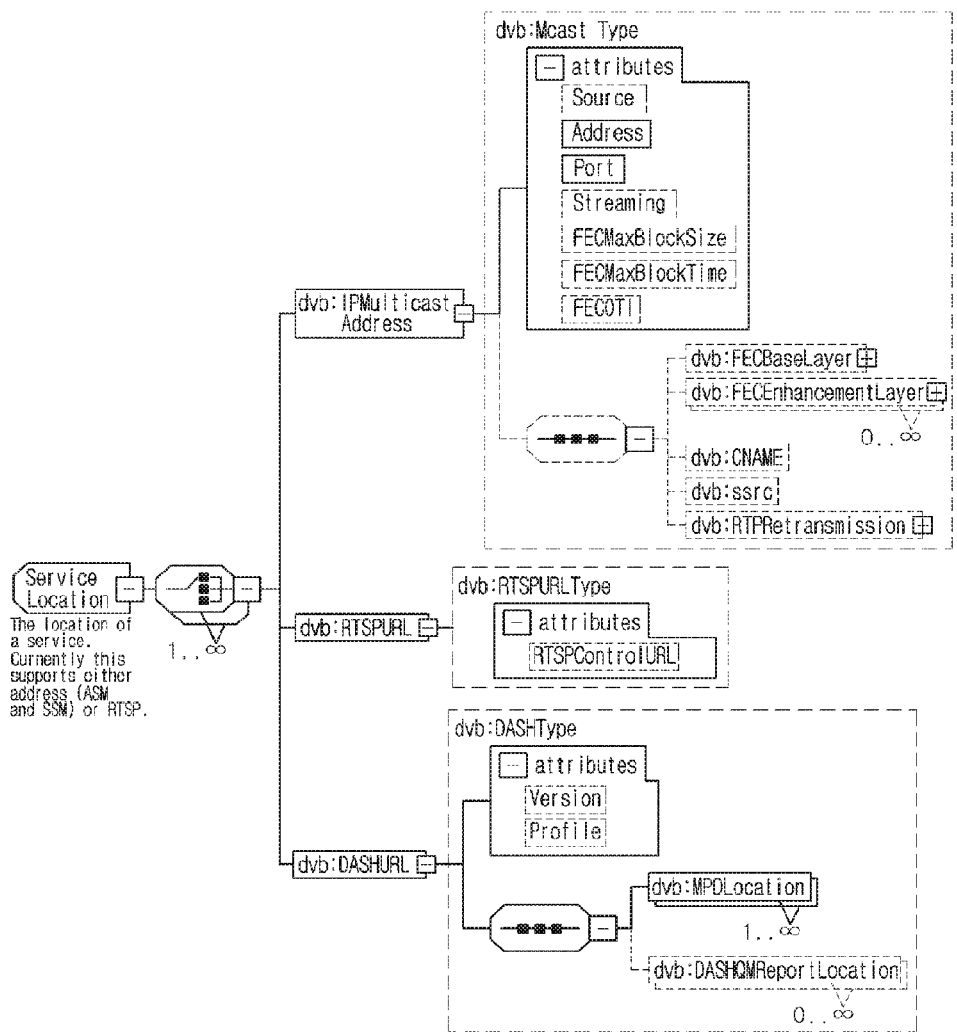
FIG. 10 is a view illustrating an XML structure of a ServiceLocation element according to an embodiment of the present invention.

FIG. 10 is a view illustrating an XML structure of a ServiceLocation element according to an embodiment of the present invention.

As shown in FIG. 10, the ServiceLocation element includes zero or one or two or more IPMulticastAddress elements, zero or one or two or more RTSPURL elements, and zero or one or two or more DASHURL elements. In such a way, according to an embodiment of the present invention, elements different from an existing IPMulticastAddress element and an existing RTSPURL element is added to a ServiceLocation element and the added elements may contain information on MPD metadata.

The DASHURL element includes a version attribute, an MPD location attribute, a profile element, and a DASHQMLocation element. Table 3 illustrates information in the DASHURL element.

TABLE 3

| Field name | Range | Type | Meaning | Example |
|---|---|---|---|---|
| Version | 0 to 1 | Unsigned integer | This field indicates the version of DASH spec. The version of the DASH spec may be changed in the future and accordingly, a function of MPD schema may extend. Thus, a receiver may need to check the version of MPD before receiving MPD. | This version corresponds to the most front "version" information (e.g., version = "1.0") |
| MPDLocation | 1 to ∞ | URL | This field has URL for receiving MPD metadata | http://dash/netflix.com/drama/season1/dash/0010.mpd |
| Profile | 0 to ∞ | Textual | This field has profile information that MPD supports. Since the size of an MPD file increased, a receiver accesses MPD fit for a | MPEG-2 Ts Main, MPEG-2 Ts Simple, MP4 Main, MP4 CoD profile |

TABLE 3-continued

| Field name | Range | Type | Meaning | Example |
| --- | --- | --- | --- | --- |
| DASHQMLocation | 0 to ∞ | URL | DASH profile that the receiver is capable of processing. This field indicates a server address to which a receiver reports all errors that may occur during all processes while receiving and processing media segments after receiving, parsing, and processing MPD. | http://dashqm.netflix.com/repor |

The media content receiving device 100 obtains a DASHURL element from a ServiceLocation element in operation S311.

The media content receiving device 100 obtains information on an MPD metadata file from the DASHURL element in operation S313. As described above, the information on an MPD metadata file includes at least one of information on the location of the MPD metadata file, the DASH spec version of the MPD metadata file, information on a profile that the MPD metadata file supports, and information on the address of a server for reporting an error during a processing process of the MPD metadata file.

Figure 11:
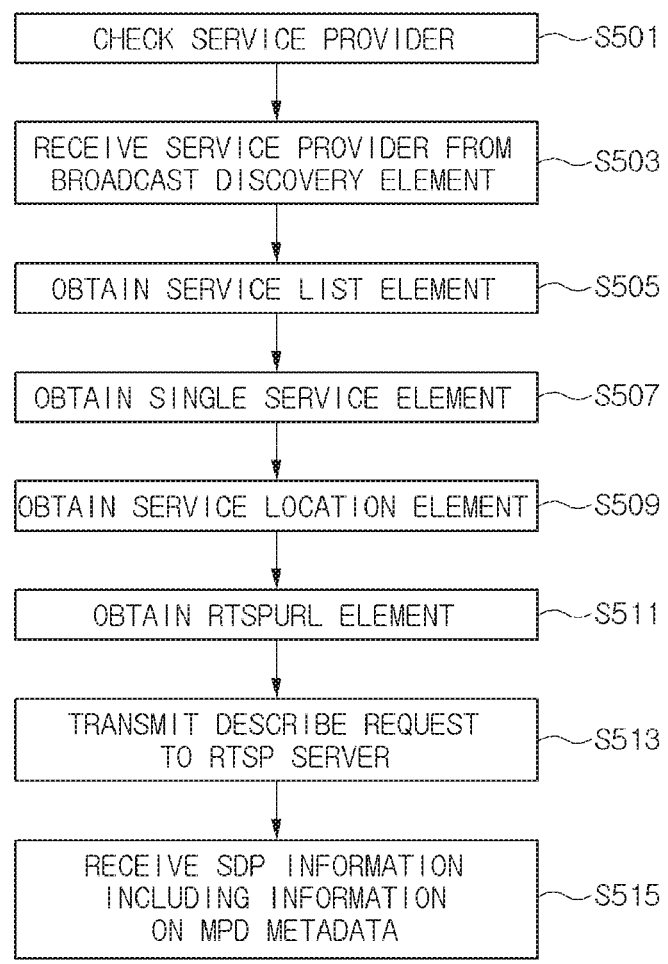
FIG. 11 is a flowchart illustrating a method of receiving information on MPD metadata according to an embodiment of the prevent invention.

FIG. 11 is a flowchart illustrating a method of receiving information on MPD metadata according to an embodiment of the prevent invention.

Especially, FIG. 11 illustrates a method of receiving information on MPD metadata in a DVB-IPTV environment.

A service displaying broadcast content on a screen in a guide format through an IPTV is called a BCG. When receiving a broadcasting service including an interactive BCG, the media content receiving device 100 plays the interactive EPG. Then, when receiving a user input for playing a media content relating to a real-time broadcast program through the BCG is received through a remote controller, the media content receiving device 100 receives and plays a DASH service including the media content relating to the IPTV real time broadcast program.

Additionally, if it is allowed in the BCG that content providers such as Netflix transmit media content on the basis of DASH via the CDN, the media content receiving device 100 subscribed to the Netflix service may play content through an IPTV. In this case, the IPTV operator may be paid for transmission from Netflix and since the numbers of transmission systems and played media are increased, service subscribers to Netflix may be further increased and Netflix may provide stable service.

Hereinafter, a method of the media content receiving device 100 to receive information on MPD metadata in a DVB-IPTV environment will be described in more detail.

The media content receiving device 100 may perform a procedure from operation S501 to S509 corresponding to operation S310 to operation S309 described above.

The media content receiving device 100 obtains a Real Time Streaming Protocol uniform resource locator (RTSPURL) element from a ServiceLocation element in operation S511.

The media content receiving device 100 transmits a DESCRIBE request to an RTSP server corresponding to a real time streaming protocol uniform resource location in a real time streaming protocol uniform resource location element in operation S513. The RTSP server may transmit Session Description Protocol (SDP) Information including information on MPD metadata to the media content receiving device 100 in response to the DESCRIBE request.

In response to the DESCRIBE request, the media content receiving device 100 receives Session Description Protocol (SDP) Information including information on MPD metadata in operation S515. At this point, the media content receiving device 100 receives MPD metadata instead of SDP information. The media content receiving device 100 may receive SDP information including MPD metadata.

A method of receiving a DESCRIBE request and MPD metadata will be described with reference to Table 4 to Table 7.

Table 4 illustrates a DESCRIBE request according to an embodiment of the present invention and Table 5 illustrates SDP information according to an embodiment of the present invention.

TABLE 4

C->S: DESCRIBE rtsp://server.example.com/fizzle/foo RTSP/1.0
CSeq: 312
Accept: application/sdp, application/rtsl, application/mheg

TABLE 5

S->C: RTSP/1.0 200 OK
CSeq: 312

TABLE 5-continued

Date: 23 Jan 1997 15:35:06 GMT
Content-Type: application/sdp
Content-Length: ...
v=0
s=Drama Season 1
u=http://dash.netflix.com/drama/season1/dash/0010.mpd According to an embodiment of the present invention, when the media content receiving device 100 transmits a DESCRIBE request for requesting SDP information of which content type is "application/sdp" to the RTSP server as shown in Table 4, the RTSP server may transmit SDP information to the media content receiving device 100 as shown in Table 5.

As shown in Table 5, the SDP information may include a u-line including information on the address of MPD metadata and additional information. The SDP information may include at least one u-line. Table 5 illustrates only SDP information including only the address of MPD metadata among information on the MPD metadata but according to another embodiment of the present invention, the SDP information may further include version information on the MPD metadata, information on a profile that the MPD metadata supports, and information on the issue report address of the MPD metadata.

Furthermore, according to another embodiment of the present invention, before the DESCRIBE request, the media content receiving device 100 may obtain version information on the MPD metadata, information on a profile that the MPD metadata supports, and information on the issue report address of the MPD metadata through another method. For example, before the DESCRIBE request, the media content receiving device 100 may obtain version information on the MPD metadata, information on a profile that the MPD metadata supports, and information on the issue report address of the MPD metadata through the method shown in FIG. 7.

The media content receiving device 100 may obtain the address of MPD metadata from the u-line of SDP information and may receive the MPD metadata by requesting the MPD metadata from the obtained MPD metadata address.

According to such a method, without modifying an existing RTSP server, the media content receiving device 100 may obtain information on MPD metadata from the RTSP server.

Table 6 illustrates a DESCRIBE request according to another embodiment of the present invention and Table 7 illustrates MPD metadata according to another embodiment of the present invention.

TABLE 6

C->S: DESCRIBE rtsp://server.example.com/fizzle/foo RTSP/1.0
CSeq: 312
Accept: application/dash+xml

TABLE 7

S->C: RTSP/1.0 200 OK
CSeq: 312
Date: 23 Jan 1997 15:35:06 GMT
Content-Type: application/dash+xml
Content-Length: ...
<?xml version="1.0" encoding="UTF-8"?>
<MPD
    xmlns:xsi="http://www.w3.org/2001/XMLSchema-instance"
    xmlns="urn:mpeg:DASH:schema:MPD:2011"
    xsi:schemaLocation="urn:mpeg:DASH:schema:MPD:2011"
    type="static"    mediaPresentationDuration="PT6158S"
    availabilityStartTime="2011-05-10T06:16:42"
    minBufferTime="PT1.4S"    profiles="urn:mpeg:profile:dash:m2ts-simple"
    maxSegmentDuration="PT4S">
    <BaseURL>http://cdn1.example.com/</BaseURL>
    <BaseURL>http://cdn2.example.com/</BaseURL>
    <Period id="42" duration="PT6158S">
        <AdaptationSet
          mimeType="video/mp2t"  codecs="avc1.4D401F,mp4a"
          frameRate="24000/1001"  segmentAlignment="true"
          subsegmentAlignment="true"  bitstreamSwitching="true"
          startWithSAP="2"  subsegmentStartsWithSAP="2">
        <ContentComponent contentType="video" id="481"/>
        <ContentComponent contentType="audio" id="482" lang="en"/>
        <ContentComponent contentType="audio" id="483" lang="es"/>
        <BaseURL>SomeMovie_</BaseURL>
        <SegmentTemplate
          media="$RepresentationID$_$Number%05$.ts"
          index="$RepresentationID$.sidx"
          initialisation="$RepresentationID$-init.ts"
          bitstreamSwitching="$RepresentationID$-bssw.ts"
          duration="4"  startNumber="1"/>
    <Representation id="720kbps" bandwidth="792000" width="640" height="368"/>
    <Representation id="1130kbps" bandwidth="1243000" width="704" height="400"/>
    <Representation id="1400kbps" bandwidth="1540000" width="960" height="544"/>
    <Representation id="2100kbps" bandwidth="2310000" width="1120" height="640"/>
    <Representation id="2700kbps" bandwidth="2970000" width="1280" height="720"/>

TABLE 7-continued

```
        <Representation id="3400kbps" bandwidth="3740000" width="1280"
          height="720"/>
      </AdaptationSet>
    </Period>
</MPD>
```

According to another embodiment of the present invention, when the media content receiving device 100 transmits a DESCRIBE request for requesting MPD metadata of which content type is "application/dash+xml" to the RTSP server as shown in Table 6, the RTSP server may transmit the MPD metadata to the media content receiving device 100 as shown in Table 7. According to such a method, it may be necessary to edit an existing RTSP server.

Before the DESCRIBE request, the media content receiving device 100 may obtain version information on the MPD metadata, information on a profile that the MPD metadata supports, and information on the issue report address of the MPD metadata through another method. For example, before the DESCRIBE request, the media content receiving device 100 may obtain version information on the MPD metadata, information on a profile that the MPD metadata supports, and information on the issue report address of the MPD metadata through the method shown in FIG. 7.

Figure 12:
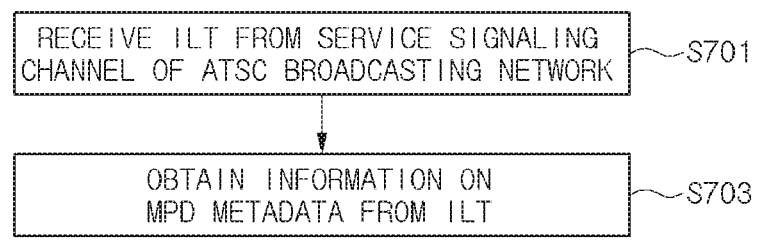
FIG. 12 is a flowchart illustrating a method of receiving information on MPD metadata according to an embodiment of the prevent invention.

FIG. 12 is a flowchart illustrating a method of receiving information on MPD metadata according to an embodiment of the prevent invention.

Especially, FIG. 12 illustrates a method of receiving information on MPD metadata in ATSC terrestrial broadcast.

The media content receiving device 100 receives an internet location table (ILT) from a service signaling channel of an ATSC broadcasting network in operation S701. The ILT is used to signal various types of internet locations that the media content receiving device 100 requires. Once the ILT is transmitted in broadcast stream, it shows in a service signaling channel defined in the ATSC NRT Standard. The ILT may be transmitted together with signaling tables such as a service map table (SMT) and a non-real-time information table (NRT-IT) of a Service Signaling Channel (SSC) for ATSC 2.0 and provides a Trigger stream URL of a Usage reporting server. It is possible to signal a DASH service relating to a real-time broadcast channel through an ILT of an SSC.

The ILT will be described with reference to Table 8.

Table 8 illustrates a syntax of an ILT.

TABLE 8

| Syntax | No. of Bits | Format |
|---|---|---|
| internet_locations_table_section( ) { | | |
|   table_id | 8 | TBD |
|   section_syntax_indicator | 1 | '1' |
|   private_indicator | 1 | '1' |
|   reserved | 2 | '11' |
|   section_length | 12 | uimsbf |
|   table_id_extension { | | |
|     protocol_version | 8 | uimsbf |
|     subnet_id | 8 | uimsbf |
|   } | | |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   locations_defined | 8 | uimsbf |

TABLE 8-continued

| Syntax | No. of Bits | Format |
|---|---|---|
|   for (i=0; i< locations_defined; i++) { | | |
|     URL_function_code | 4 | uimsbf |
|     reserved | 4 | '1111 1' |
|     If (URL_function_code == 0) { | | |
|       service_id | 16 | uimsbf |
|     } | | |
|     else If (URL_function_code == 1) { | | |
|       trigger_stream_id | 8 | |
|       reserved | 8 | |
|     } | | |
|     else if ( URL_function_code == 2) | | |
|     { | | |
|       supplementary_type | 8 | uimsbf |
|       DASH_version | 8 | uimsbf |
|       DASH_profile | 8 | uimsbf |
|     } | | |
|     else { | | |
|       reserved | 16 | |
|     } | | |
|     URL_length | 8 | uimsbf |
|     for (k=0; k<URL_length; k++) { | | |
|       URL_byte | 8 | uimsbf |
|     } | | |
|   } | | |
|   reserved | 4 | '1111' |
|   number_of_descriptors | 4 | uimsbf |
|   for (i=0; i<N;I++) { | | |
|     descriptor( ) | | variable |
|   } | | |
| } | | |

As shown in Table 8, the ITT includes a table_id field, a protocol_version field, a subnet_id field, a version_number field, a current_next_indicator field, a section_number field, a last_section_number field, a locations_defined field, at least one location loop, a number_of_descriptors field, and at least one descriptor.

The table_id field has a value for identifying this table as belonging to an ILT.

The protocol_version field indicates the protocol version of this table.

The subnet_id field indicates an IP subnet relating to a service signaling channel where this table shows.

The version_number field indicates the version number of this table.

The current_next_indicator field may be set to 1 at all times for an ILT.

The section_number field indicates the section number of this ILT instance section. A value of the section_number field of the first section in an ILT instance is 0x00 and increased by 1 each time a section is added.

The last_section_number field indicates the last section number of an ILT instance.

The number_of_descriptors field indicates the number of at least one descriptor.

The locations_defined field indicates the number of internet locations in an ILT. Especially, the locations_defined field indicates the number of at least one location loop.

Each location loop includes a URL_function_code field, a URL_length field, and at least one URL_byte field.

The URL_length field indicates the number of at least one URL_byte field.

At least one URL_byte field provides an internet location.

The URL_function_code field indicates the purpose of a URL in this location loop. For example, a value of the URL_function_code field may be defined as shown in Table 9.

TABLE 9

| URL_function_code value | Meaning |
|---|---|
| 0 | URL for Usage Reporting |
| 1 | URL for Trigger Stream retrieval via Internet |
| 2 | URL for supplementary AV stream (based on DASH) |
| 3-15 | Reserved |

When URL_function_code field indicates the internet location of a usage reporting server, the location loop further includes a service id field. The service id field indicates the service identifier of a service through which a usage report is transmitted using the URL of this location loop. When URL_function_code field indicates the internet location of a usage reporting server, the URL of this location loop indicates the internet location of the usage reporting server.

When URL_function_code field indicates the internet location of a trigger stream, the location loop further includes a trigger_stream_id field. The trigger_stream_id field indicates the trigger stream identifier of a trigger stream receivable using the URL in this location loop. When URL_function_code field indicates the internet location of a trigger stream, the URL in this location loop indicates the internet location of a trigger stream.

When the URL_function_code field indicates the internet location of a DASH based Supplementary AV stream, the location loop may further include a Supplementary_type field, a DASH_version field, and a DASH_profile field. The DASH_version field and the DASH_profile field correspond to the version field and the profile field in Table 3. When the URL_function_code field indicates the internet location of a DASH based Supplementary AV stream, the URL in this location loop indicates the internet location of an MPD metadata file.

The Supplementary_type field indicates the type of a Supplementary AV stream. For example, a value of the Supplementary_type field may be defined as shown in Table 10.

TABLE 10

| Supplementary_type | Meaning |
|---|---|
| 0 | Replacement service - service replaceable when main real time broadcast reception state is poor |
| 1 | PIP service - service used as PIP together with main real time broadcast |
| 2 | Promotional content - advertising purpose related content |
| 3-15 | Reserved |

The media content receiving device 100 obtains information on MPD metadata from an ILT in operation S703. As described above, the information on an MPD metadata file includes at least one of information on the location of each MPD metadata file, the DASH spec version of each MPD metadata file, information on a profile that each MPD metadata file supports, and information on the address of a server for reporting an error during a processing process of each MPD metadata file. The media content receiving device 100 obtains information on the DASH spec version of an MPD metadata file from the DASH_version field of an ILT, obtains information on a profile that an MPD metadata file supports from the DASH_profile field of an ILT, and obtains information on the location of an MPD metadata file from at least one URL_byte field of a ILT.

Figure 13:
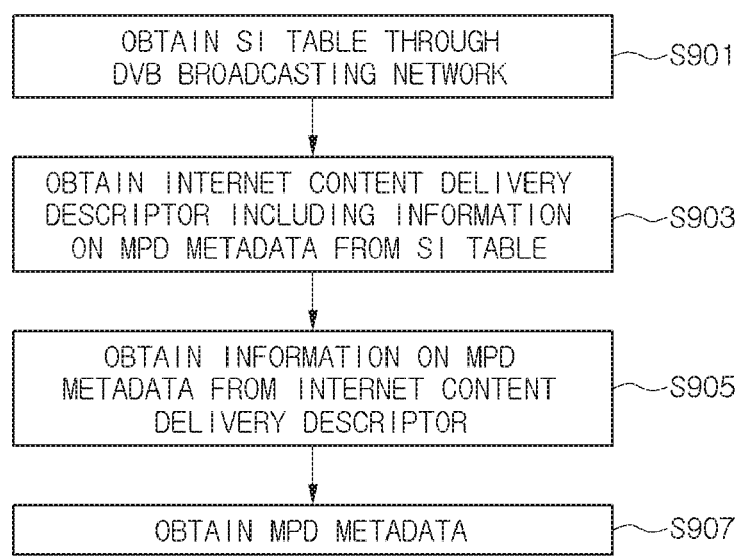
FIG. 13 is a flowchart illustrating a method of receiving information on MPD metadata according to an embodiment of the prevent invention.

FIG. 13 is a flowchart illustrating a method of receiving information on MPD metadata according to an embodiment of the prevent invention.

Especially, FIG. 13 illustrates a method of receiving information on MPD metadata in a DVB broadcasting system.

The DVB broadcasting system notifies DASH service to a receiver by using DVS-SI information in broadcast stream. When creating a broadcast stream, the DVB broadcasting system notifies DVS-SI information including information on what kind of broadcast channels exist and what kind of information exists additionally to a receiver. The receiver processes this DVB_SI information to tune a channel and display supplementary information for user convenience on a screen. The DVB-SI includes a Program Association Table (PAT) called a PSI Table, a Program Map Table (PMT), and a Network Information Table (NIT). Additionally, the DVB-SI further includes a Network Information Table (NIT) called an SI table, a Bouquet Association Table (BAT), a Service Description Table (SDT), and an Event Information Table (EIT). This SI Table mainly describes service and contains service delivery information and Electronic Program Guide (EPG) information.

An SDT includes data describing service in a system. For example, the SDT includes information on the names of services, a service provider, a language code of a service, a running status of a service, and a service available region. The receiver does not show service when the receiver is not in the service available region and shows service when the receiver is in the service available region according to information on the service available region.

The SDT includes a service descriptor as shown in Table 11.

TABLE 11

| Syntax | Number of bits | Identifier |
|---|---|---|
| service_descriptor( ){ | | |
|   descriptor_tag | 8 | uimsbf |
|   descriptor_length | 8 | uimsbf |
|   service_type | 8 | uimsbf |
|   service_provider_name_length | 8 | uimsbf |
|   for (i=0;i<N;I++){ | | |
|     char | 8 | uimsbf |
|   } | | |
|   service_name_length | 8 | uimsbf |
|   for (i=0;i<N;I++){ | | |
|     char | 8 | uimsbf |
|   } | | |
| } | | |

As shown in Table 11, a service descriptor in the SDT includes a service_type field. For example, a value of the service_type field may be defined as shown in Table 12.

TABLE 12

| Service_type | Description |
| --- | --- |
| 0x00 | reserved for future use |
| 0x01 | digital television service(see note 1) |
| 0x02 | digital radio sound service(see note 2) |
| 0x03 | Teletext service |
| 0x04 | NVOD reference service(see note 1) |
| 0x05 | NVOD time-shifted service(see note 1) |
| 0x06 | mosaic service |
| 0x07 | FM Radio service |
| 0x08 | DVB SRM service |
| 0x09 | reserved for future use |
| 0x0A | Advanced codec digital radio sound service |
| 0x0B | Advanced codec mosaic service |
| 0x0C | data broadcast service |
| 0x0D | reserved for Common Interface Usage (EN 50221) |
| 0x0E | RCS Map (see EN 301 790) |
| 0x0F | RCS FLS (see EN 301 790) |
| 0x10 | DVB MHP service |
| 0x11 | MPEG-2 HD digital television service |
| 0x12 to 0x15 | reserved for future use |
| 0x16 | Advanced codec SD digital television service |
| 0x17 | Advanced codec SD NVOD time-shifted service |
| 0x18 | Advanced codec SD NVOD reference service |
| 0x19 | Advanced codec HD digital television service |
| 0x1A | Advanced codec HD NVOD time-shifted service |
| 0x1B | Advanced codec HD NVOD reference service |
| 0x1C to 0x7F | reserved for future use |
| 0x80 to 0xFE | user defined |
| 0xFF | reserved for future use |

NOTE 1:
MPEG-2 SD material should use this type.
NOTE 2:
MPEG-1 Layer 2 audio material should use this type.

If a DVB receiver is connected to internet, it may receive and play media content services, for example, internet Live Streaming service, internet VoD service, interne audio service, and internet PIP service. Accordingly, a value of the service_type field may extend and be used for internet media content service as shown in Table 13. The DVB receiver receives a DVB broadcasting service and outputs an internet audio service through a speaker while displaying a video of the DVB broadcasting service on a screen

TABLE 13

| service_type | Description |
| --- | --- |
| 0x1C | Internet Live service |
| 0x1D | Internet VoD service |
| 0x1E | Internet audio service (e.g, audio language) |
| 0x1F | PIP service over Internet |

A Linkage Descriptor shown in Table 14 may be included in an Event Information Table (EIT).

TABLE 14

| Syntax | Number of bits | Identifier |
| --- | --- | --- |
| linkage_descriptor( ){ | | |
|   descriptor_tag | 8 | uimsbf |
|   descriptor_length | 8 | uimsbf |
|   transport_stream_id | 16 | uimsbf |
|   original_network_id | 16 | uimsbf |
|   service_id | 16 | uimsbf |
|   linkage_type | 8 | uimsbf |
|   if (linkage_type !=0x08){ | | |
|     for (i=0;i<N;i++){ | | |
|       private_data_byte | 8 | bslbf |
|     } | | |
|   } | | |

TABLE 14-continued

| Syntax | Number of bits | Identifier |
| --- | --- | --- |
|   if (linkage_type ==0x08){ | | |
|     hand-over_type | 4 | bslbf |
|     reserved_ future_ use | 3 | bslbf |
|     origin_type | 1 | bslbf |
|     if (hand-over_type ==0x01 | | |
|     || hand-over_type ==0x02 | | |
|     || hand-over_type ==0x03){ | | |
|       network_id | 16 | uimsbf |
|     } | | |
|     if (origin_type ==0x00){ | | |
|       initial_service_id | 16 | uimsbf |
|     } | | |
|     for (i=0;i<N;i++){ | | |
|       private_data_byte | 8 | bslbf |
|     } | | |
|   } | | |
| } | | |

As shown in Table 14, the Linkage Descriptor includes a linkage_type field. For example, a value of the service_type field may be defined as shown in Table 15 and used.

TABLE 15

| Service_type | Description |
| --- | --- |
| 0x00 | reserved for future use |
| 0x01 | information service |
| 0x02 | EPG service |
| 0x03 | CA replacement service |
| 0x04 | TS containing complete Network/Bouquet SI |
| 0x05 | service replacement service |
| 0x06 | data broadcast service |
| 0x07 | RCS Map |
| 0x08 | mobile hand-over |
| 0x09 | System Software Update Service (TS 102 006) |
| 0x0A | TS containing SSU BAT or NIT (TS 102 006) |
| 0x0B | IP/MAC Notification Service (EN 301 192) |
| 0x0C | TS containing INT BAT or NIT (EN 301 192) |
| 0x0D | event linkage (see note) |
| 0x0E to 0x7F | reserved for future use |
| 0x80 to 0xFE | user defined |
| 0xFF | reserved for future use |

NOTE 1:
A linkage_type with value 0x0D is only valid when the descriptor is carried in the EIT.

A DVB broadcasting system may need to notify a DVB receiver of the information that contents currently in broadcasting or created to be broadcasted in the near future are able to be received through internet. Accordingly, a value of the linkage_type field may extend for internet media content service and be used as shown in Table 16.

TABLE 16

| Linkage_type | Description |
| --- | --- |
| 0x0E | Internet content service |

Digital Video Broadcasting Service Information (DVB-ST) includes a Cable delivery system descriptor, a Satellite delivery system descriptor, an S2 satellite delivery system descriptor, a Terrestrial delivery system descriptor, and a DNG descriptor. The Cable delivery system descriptor may include frequency information, FEC_outer information, modulation information, symbol_rate information, and, FEC_inner information. The Satelite delivery system descriptor includes frequency information, orbital_position information, west_east_flag, polarization, roll_off, modulation_system, modulation_type, FEC_inner, and symbol_rate The Terrerstrial delivery system descriptor may include centre_frquency, bandwidth, priority, constellation, guard_interval, and code_rate.

DVB-SI until now has only signaling information for transmitting media content through a broadcasting network and extends to support a Timeshift function for Near Video On Demand (NVOD) additionally. However, the DVB broadcast receiver stays in the level that it records broadcast stream and provides it to a user and there is no way of transmitting part or all of broadcast contents through an internet network from a broadcasting station.

If internet is seen as one delivery channel, an Internet Content Delivery Descriptor for signaling DASH related information may be added.

A method of the media content receiving device 100 to receive information on MPD metadata will be described in more detail.

The media content receiving device 100 obtains an SI table through a DVB broadcasting network in operation S901. At this point, the SI table may be an EIT, an SDT, or an NIT.

The media content receiving device 100 obtains an Internet Content Delivery Descriptor including information on MPD metadata from an SI table in operation S903. In order to play content in internet, the media content receiving device 100 may not need to receive an internet Content Delivery Descriptor. The Internet Content Delivery Descriptor may be included in an EIT, an SDT, or an NIT and then transmitted. When the Internet Content Delivery Descriptor is included in an EIT, since the media content receiving device 100 may notify a user that watching a broadcast program is possible through internet on EPG, a user may selectively watch a broadcast program through a DVB channel or internet. For example, if a broadcast signal of a DVB channel is weak, a viewer may watch a broadcast program through an internet network rather than watching a broken image.

Then, the Internet Content Delivery Descriptor according to an embodiment of the present invention will be described with reference to Table. 17.

Table 17 illustrates a syntax of an Internet Content Delivery Descriptor according to an embodiment of the present invention.

TABLE 17

| Syntax | Number of bits | Identifier |
|---|---|---|
| internet_content_delivery_descriptor( ) { | | |
| descriptor_tag | 8 | uimsbf |
| descriptor_length | 8 | uimsbf |
| deserved_future_use | ? | uimsbf |
| internet_content_delivery_mode | 2 | uimsbf |
| if(internet_content_delivery_mode == 0x00) { | | |
|     content_length | 32 | uimsbf |
|     url_length | 8 | uimsbf |
|     for( i = 0; i < url_length; i++) { | | |
|         url_char | 8 | uimsbf |
|     } | | |
| } | | |
| if(intetnet_content_delivery_mode == 0x01) { | | |
|     bitrate | 4 | uimsbf |
|     buffering_size | 20 | uimsbf |
|     for( i = 0; i < url_length; i++) { | | |
|         url_char | 8 | uimsbf |
|     } | | |
| } | | |
| if(internet_content_delivery_mode == 0x02) { | | |
|     simulcast_flag | 1 | uimsbf |
|     MPD_transport_mode | 1 | uimsbf |
|     MPD_compression | 1 | uimsbf |
|     MPD_version | 16 | uimsbf |
|     MPD_support_profile | 3 | uimsbf |
|     If(MPD_transport_mode == 0x00) { | | |
|         for( i = 0; i < url_length; i++) { | | |
|             MPD_url_char | 8 | uimsbf |
|         } | | |
|     } | | |
|     If(MPD_transport_mode == 0x01) { | | |
|         MPD_data_length | 16 | uimsbf |
|         for(j = 0; j < MPD_data_length; j++) { | | |
|             MPD_data_byte | 8 | uimsbf |
|         } | | |
|     } | | |
|     qm_report_flag | 1 | Uimsbf |
|     If(qm_report_flag == 1) { | | |
|         qm_report_length | 8 | uimsbf |
|         for( i = 0; i < qm_url_length; i++) { | | |
|             qm_url_char | 8 | uimsbf |
|         } | | |
|     } | | |
| } | | |

As shown in Table 17, the Internet Content Delivery Descriptor includes a descriptor_tag field, a descriptor_length field, a deserved_future_use field, and an internet_content_delivery_mode field.

The descriptor_tag field has a value for notifying that this descriptor is an internet Content Delivery Descriptor.

The descriptor_length field indicates the length of this internet Content Delivery Descriptor.

The internet_content_delivery_mode field indicates how to transmit content on internet. For example, a value of the internet_content_delivery_mode field may be defined as shown in Table 18.

TABLE 18

| Value | Meaning |
|---|---|
| 0x00 | Download and Play mode |
| 0x01 | HTTP Progressive mode |
| 0x02 | Adaptive Streaming mode |

When the internet_content_delivery_mode field indicates "download and play mode", an Internet Content Delivery Descriptor further includes a content_length field, a url_length field, and at least one url_char field.

The content_length field indicates the length of content. The url_length field indicates the number of url_char fields. At least one URL_byte field provides an internet location. The media content receiving device 100 may receive the content of the internet location that at least one url_char field indicates as "download and play mode". The media content receiving device 100 may download and store the content of the corresponding internet location and may then play it.

When the internet_content_delivery_mode field indicates "HTTP progressive mode", an Internet Content Delivery Descriptor further includes a bitrate field, a buffering_size field, and at least one url_char field. At least one url_char field indicates the internet location of content. The media content receiving device 100 may receive the content of the internet location that at least one url_char field indicates as "HTTP progressive mode". The media content receiving device 100 may download part of a content of a corresponding internet location and may store the downloaded data in a buffer, and then when reaching a playable state, may perform the download and playback of the content of the corresponding internet location simultaneously.

If the internet_content_delivery_mode field indicates "adaptive streaming mode", the Internet Content Delivery Descriptor further includes a simulcast_flag field, an MPD_transport_mode field, an MPD_compression field, an MPD_version field, an MPD_support_profile field, and a qm_report_flag field.

The simulcast_flag field indicates whether a current broadcast program is transmitted through internet. If Simulcast_flag is set to '1', this indicates that the current broadcast program is transmitted through internet.

If the simulcast_flag field indicates that the current broadcast program is transmitted through internet, in the case that a state of an image is poor due to an antenna issue, a weak broadcast signal, a broadcast receiving module issues, the media content receiving device 100 may automatically access an internet network to receive and play a DASH service.

The MPD_transport_mode field includes information how to transmit MPD metadata. For example, a value of the MPD_transport_mode field may be defined as shown in Table 19.

TABLE 19

| value | Meaning |
|-------|---------|
| 0x00  | The location of MPD file is identified in the URL carried in the MPD_url_char. MPD_url_char is sequence of characters. |
| 0x01  | The MPD is delivered in the MPD_data_bytes |

As shown in Table 19, the MPD_transport_mode field may indicate that MPD metadata is transmitted through internet or MPD metadata is transmitted through broadcast stream.

If the MPD_transport_mode field indicates that MPD metadata is transmitted through internet, the Internet Content Delivery Descriptor may further include information on the internet location of the MPD metadata. For example, the Internet Content Delivery Descriptor may further include at least one MPD_url_char field. At least one MPD_url_char field may include information on the internet location of MPD metadata.

If the MPD_transport_mode field indicates that MPD metadata is transmitted through internet, the Internet Content Delivery Descriptor may further include MPD metadata. For example, the Internet Content Delivery Descriptor may further include at least one MPD_data_byte field. At least one MPD_data_byte field may include MPD metadata.

The MPD_compression field may include information on whether MPD metadata is compressed and information on a compression algorithm of MPD metadata. For example, a value of the MPD_compression field may be defined as shown in Table 20.

TABLE 20

| value | Meaning |
|-------|---------|
| 0x00  | Uncompressed MPD |
| 0x01  | MPD has been compressed with GZIP |

The MPD_version field indicates the DASH spec version of MPD metadata.

The MPD_support_profile field indicates a profile that an MPD metadata file supports. For example, a value of the MPD_support_profile field may be defined as shown in Table 21.

TABLE 21

| value | Meaning |
|-------|---------|
| 0x00 | MR4 Simple |
| 0x01 | MR4 Main |
| 0x02 | MR4 Live |
| 0x03 | MPEG-2 TS Simple |
| 0x04 | MPEG-2 TS Main |
| 0x05 to 0x06 | DVB reserved |
| 0x07 | User Private |

The qm_report_flag field indicates whether the Internet Content Delivery Descriptor includes information on the server address for notifying an error during a processing process of an MPD metadata file.

For example, when a value of the qm_report_flag field is 1, the Internet Content Delivery Descriptor includes information on the server address for notifying an error during a processing process of an MPD metadata file.

When the internet_content_delivery_mode field indicates "adaptive streaming mode", information on internet media content may be described using a Content descriptor and the type of internet content may be described using a Component descriptor.

The media content receiving device 100 obtains information on MPD metadata from an Internet Content Delivery Descriptor in operation 905. As described above, the information on an MPD metadata file includes at least one of information on the location of each MPD metadata file, the DASH spec version of each MPD metadata file, information on a profile that each MPD metadata file supports, and information on the address of a server for reporting an error during a processing process of each MPD metadata file. Additionally, information on an MPD metadata file includes at least one of information on whether the current broadcast program is transmitted through internet, information on whether MPD metadata is compressed, and information on a compression algorithm of MPD metadata. The media content receiving device 100 obtains information on the DASH spec version of an MPD metadata file from the DASH_version field of an Internet Content Delivery Descriptor, obtains information on a profile that an MPD metadata file supports from the DASH_support_profile field of an Internet Content Delivery Descriptor, and obtains information on the location of an MPD metadata file from at least one MPD_url_char field of an Internet Content Delivery Descriptor. The media content receiving device 100 may obtain information on whether the current broadcast program is transmitted through internet from the simulcast_flag field of an Internet Content Delivery Descriptor. The media content receiving device 100 may obtain at least one of information on whether MPD metadata is compressed and information on a compression algorithm of MPD metadata from the MPD_compression field of an Internet Content Delivery Descriptor.

The media content receiving device 100 may obtain MPD metadata in operation 907. According to an embodiment of the present invention, the media content receiving device 100 obtains MPD metadata from the internet location of an MPD metadata file in an Internet Content Delivery Descriptor. According to another embodiment of the present invention, the media content receiving device 100 obtains MPD metadata from at least one MPD_data_byte field in an Internet Content Delivery Descriptor.

The media content receiving device 100 checks whether MPD metadata is compressed by using the MPD_compression field in an Internet Content Delivery Descriptor. When the MPD metadata is compressed, the media content receiving device 100 checks a compression algorithm of the MPD metadata by using the MPD_compression field in an Internet Content Delivery Descriptor and decompresses the MPD metadata by using the checked compression algorithm.

Then, a media content receiving device according to an embodiment of the present invention will be described with reference to FIG. 14.

Figure 14:
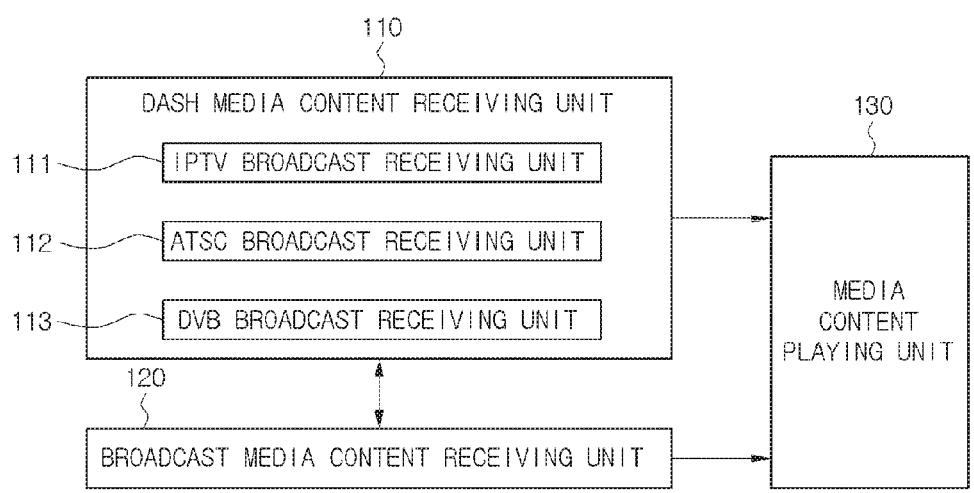
FIG. 14 is a block diagram illustrating a structure of a media content receiving device according to an embodiment of the present invention.

FIG. 14 is a block diagram illustrating a structure of a media content receiving device according to an embodiment of the present invention.

As shown in FIG. 14, the media content receiving device 100 includes a DASH media content receiving unit 110, a broadcast media content receiving unit 120, and a media content playing unit 130.

The DASH media content receiving unit 110 may receive information on a content location information file. For example, the content location information file may be an MPD metadata file. As described above, information on a content location information file includes at least one of information on the location of a content location information file, the DASH spec version of a content location information file, information on a profile that a content location information file supports, and information on the address of a server for reporting an error during a processing process of a content location information file.

The DASH media content receiving unit 110 receives a content location information file by using information on a content location information file, measures the current bandwidth, requests first media content through a first network on the basis of the current bandwidth and the content location information file, and receives the first media content through the first network.

The DASH media content receiving unit 110 receives information on a plurality of content location information files, selects a content location information file corresponding a required capacity that a media content receiving device is capable of processing from the plurality of content location information files, requests the selected content location information file from an internet location corresponding to the selected content location information file, and receives the selected content location information file.

The DASH media content receiving unit 110 may include at least one of an IPTV broadcast receiving unit 111, an ATSC broadcast receiving unit 112, and a DVB broadcast receiving unit 113.

The IPTV broadcast receiving unit 111 checks a service provider of an IPTV, receives broadcast discovery information from the service provider, obtains service location information from the broadcast discovery information, and obtains a content location information file from the service location information.

The ATSC broadcast receiving unit 112 may receive an ILT from a service signaling channel of ATSC and may obtain information on a content location information file from the ILT.

The DVB broadcast receiving unit 113 may receive an SI table from a DVB broadcast channel, obtains an Internet Content Delivery Descriptor from the SI table, and obtains information on a content location information file from the Internet Content Delivery Descriptor.

The broadcast media content receiving unit 120 receives a second media content through a second network. As describe above, the first network is a network where QoS is not secured and the second network is a network where QoS is secured. For example, the first network is an IP based network and the second network is a broadcast network.

The media content playing unit 130 consumes the first media content. Especially, the media content playing unit 130 may consume a combined service by combining the first media content and the second media content. As described above, the combined service may be one of PIP service, audio alternative service, high-quality audio service, interactive electronic program guide service, and 3D image service.

Then, a media content transmitting device according to an embodiment of the present invention will be described with reference to FIG. 15.

Figure 15:
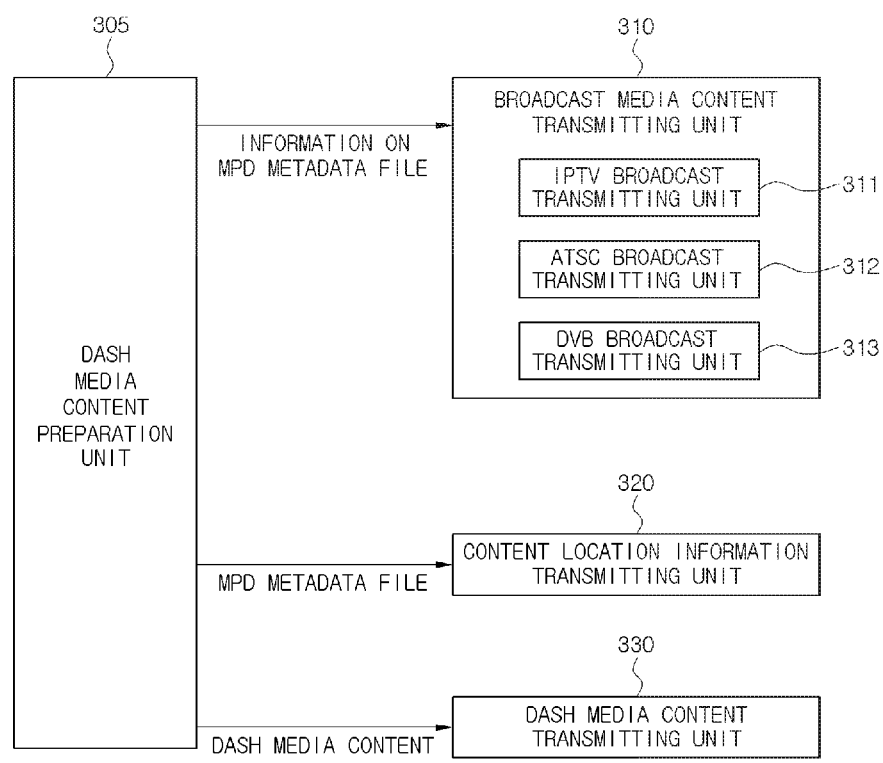
FIG. 15 is a block diagram illustrating a structure of a media content transmitting device according to an embodiment of the present invention.

FIG. 15 is a block diagram illustrating a structure of a media content transmitting device according to an embodiment of the present invention.

The media content transmitting device 300 includes a DASH media content preparation unit 305, a broadcast media content transmitting unit 310, a content location information transmitting unit 320, and a DASH media content transmitting unit 330.

The content transmitting device 300 may be realized with a content transmitting system. The DASH media content preparation unit 305, the broadcast media content transmitting unit 310, the content location information transmitting unit 320, and the DASH media content transmitting unit 330 may be realized separate from a server.

The DASH media content preparation unit 305 prepares an adaption set and a content location information file. For example, the content location information file may be an MPD metadata file.

The broadcast media content transmitting unit 310 transmits information on a content location information file through a first network.

The content location information transmitting unit 320 transmits a content location information file to the media content receiving device 100.

The DASH media content transmitting unit 330 transmits a media segment in an adaptation set to the media content receiving device 100 through the second network in response to a request based on the content location information file.

The broadcast media content transmitting unit 310 may include at least one of an IPTV broadcast transmitting unit 311, an ATSC broadcast transmitting unit 312, and a DVB broadcast transmitting unit 313.

The IPTV broadcast transmitting unit 311 may transmit the above-mentioned broadcast discovery information through an IPTV broadcast network.

The ATSC broadcast transmitting unit 312 may transmit the ILT shown in Table 8 through an ATSC broadcast network.

The DVB broadcast transmitting unit 313 may transmit the Internet Content Delivery Descriptor shown in Table 17 through a DVB broadcast network.

According to an embodiment of the present invention, the above method also can be embodied as computer readable codes on a computer readable recording medium having a program recorded thereon. Examples of the computer readable recording medium include read-only memory (ROM), random-access memory (RAM), CD-ROMs, magnetic tapes, floppy disks, and optical data storage devices and also include carrier waves (such as data transmission through the Internet).

The above-described mobile terminal is not applied as limited to the configurations and methods of the above embodiments. Some or all of the above embodiments are selectively combined and configured to provide various modifications.

The invention claimed is:

1. A media content receiving method for a media content receiving device, the method comprising:
   receiving first media components and service information including a Media Presentation Description (MPD) file over broadcast delivery, wherein the first media components include a main video component and a main audio component;
   requesting a second media component on the basis of the MPD file;
   receiving the second media component over unicast delivery via Hyper Text Transfer Protocol (HTTP), wherein the second media component is a sub audio component; and
   consuming the media content by combining the main video component being received over the broadcast delivery and the sub audio component being received over the unicast delivery, wherein the main video component is played with the sub audio component,
   wherein the two audio components are in different languages and are delivered via different delivery paths,
   wherein the unicast delivery is Dynamic Adaptive Streaming over HTTP (MPEG-DASH) in an internet path, and
   wherein the broadcast delivery is Advanced Television System Committee (ATSC) broadcasting.

2. The method of claim 1, wherein the service information further includes signaling information on the sub audio component.

3. A media content receiving device comprising:
   a first media component receiving unit to receive first media components and service information including a Media Presentation Description (MPD) file over broadcast delivery, wherein the first media components include a main video component and a main audio component;
   a second media component receiving unit to request a second media component on the basis of the MDP file and receive the second media component over unicast delivery via Hyper Text Transfer Protocol (HTTP), wherein the second media component is a sub audio component; and
   a client unit to consume the media content by combining the main video component being received over the broadcast delivery and the sub audio component being received over the unicast delivery, wherein the main video component is played with the sub audio component,
   wherein the two audio components are in different languages and are delivered via different delivery paths,
   wherein the service information further includes signaling information on the sub audio component,
   wherein the unicast delivery is Dynamic Adaptive Streaming over HTTP (MPEG-DASH) in an internet path, and
   wherein the broadcast delivery is Advanced Television System Committee (ATSC) broadcasting.

4. The device of claim 3, wherein the service information further includes signaling information on the sub audio component.

5. A media content transmitting method for a media content transmitting device, the method comprising:
   transmitting service information including a Media Presentation Description (MPD) file and first media components over broadcast delivery, wherein the first media components include a main video component and a main audio component and wherein the MPD file includes information about a second media component; and
   transmitting the second media component over unicast delivery via Hyper Text Transfer Protocol (HTTP), wherein the second media component is a sub audio component for the main video component of the media content and the sub audio component being transmitted over the unicast delivery is combined with the main video component being transmitted over the broadcast delivery for being consumed at a receiver,
   wherein the two audio components are in different languages and are delivered via different delivery paths,
   wherein the unicast delivery is Dynamic Adaptive Streaming over HTTP (MPEG-DASH) in an internet path, and
   wherein the broadcast delivery is Advanced Television System Committee (ATSC) broadcasting.

6. A media content transmitting device comprising:
   a first transmitter to transmit service information including a Media Presentation Description (MPD) file and first media components over broadcast delivery, wherein the first media components include a main video component and a main audio component and wherein the MPD file includes information about a second media component; and
   a second transmitter to transmit the second media component over unicast delivery via Hyper Text Transfer Protocol (HTTP), wherein the second media component is a sub audio component for the main video component for the media content and the sub audio component being transmitted over the unicast delivery is combined with the main video component being transmitted over the broadcast delivery for being consumed at a receiver,
   wherein the two audio components are in different languages and are delivered via different delivery paths,
   wherein the unicast delivery is Dynamic Adaptive Streaming over HTTP (MPEG-DASH) in an internet path, and
   wherein the broadcast delivery is Advanced Television System Committee (ATSC) broadcasting.

* * * * *